(12) United States Patent
Weiser et al.

(10) Patent No.: US 8,103,719 B2
(45) Date of Patent: *Jan. 24, 2012

(54) MESSAGE BROADCASTING CONTROL SYSTEM AND METHOD

(75) Inventors: Douglas Weiser, Port Richey, FL (US);
Mark Andrew Wood, Haslemere (GB);
Kevin Russell Preston, Gwent (GB)

(73) Assignee: Envisionit, LLC, St. Charles, MO (US)

(*) Notice: Subject to any disclaimer, the term of this patent is extended or adjusted under 35 U.S.C. 154(b) by 2 days.

This patent is subject to a terminal disclaimer.

(21) Appl. No.: 12/726,098

(22) Filed: Mar. 17, 2010

(65) Prior Publication Data

US 2010/0174779 A1 Jul. 8, 2010

Related U.S. Application Data

(63) Continuation of application No. 11/602,461, filed on Nov. 20, 2006, now Pat. No. 7,693,938.

(60) Provisional application No. 60/739,819, filed on Nov. 23, 2005.

(51) Int. Cl.
*G06F 15/16* (2006.01)
(52) U.S. Cl. ............... 709/203; 709/217; 709/227
(58) Field of Classification Search .......... 709/200–203, 709/217–227, 228; 455/404.1, 404.2, 466
See application file for complete search history.

(56) References Cited

U.S. PATENT DOCUMENTS

| | | | |
|---|---|---|---|
| 4,415,771 A | 11/1983 | Martinez | |
| 4,887,308 A | 12/1989 | Dutton | |
| 5,278,539 A | 1/1994 | Lauterbach et al. | |
| 5,592,172 A | 1/1997 | Bailey et al. | |
| 6,021,177 A | 2/2000 | Allport | |
| 6,084,510 A | 7/2000 | Lemelson et al. | |
| 6,112,075 A | 8/2000 | Weiser | |

(Continued)

FOREIGN PATENT DOCUMENTS

EP 0915598 A2 12/1999

(Continued)

OTHER PUBLICATIONS

3rd Generation Partnership Project TS 23.246, Release 6, Aug. 2004.

(Continued)

*Primary Examiner* — Moustafa M Meky
(74) *Attorney, Agent, or Firm* — Polster, Lieder, Woodruff & Lucchesi, LC

(57) ABSTRACT

A system and method of broadcast messaging for providing a broadcast message to a broadcast target area including a broadcast admission control module receiving the broadcast message record having a broadcast message, a defined broadcast target area, and a broadcast message originator identifier. The broadcast admission control module validating the broadcast message record as a function one or more of the broadcast message originator identifier, the broadcast target area, and a broadcast message transmission network parameter associated with a broadcast transmission network adapted for broadcasting the message to at least a portion of the broadcast target area. The broadcast admission control module generating a validated broadcast message record as a function of the validating. The system also includes a broadcast message distributor module receiving the validated broadcast message record and transmitting the broadcast message and the broadcast target area, or a part thereof, to an output interface distributing the broadcast message to at least a portion of the broadcast target area.

30 Claims, 15 Drawing Sheets

U.S. PATENT DOCUMENTS

| | | | |
|---|---|---|---|
| 6,169,476 B1 | 1/2001 | Flanagan | |
| 6,219,696 B1 | 4/2001 | Wynblatt et al. | |
| 6,240,360 B1 | 5/2001 | Phelan | |
| 6,255,953 B1 * | 7/2001 | Barber | 340/601 |
| 6,278,375 B1 * | 8/2001 | Hucker | 340/601 |
| 6,329,904 B1 * | 12/2001 | Lamb | 340/286.02 |
| 6,346,890 B1 | 2/2002 | Bellin | |
| 6,463,273 B1 | 10/2002 | Day | |
| 6,480,578 B1 | 11/2002 | Allport | |
| 6,490,525 B2 | 12/2002 | Baron, Sr. et al. | |
| 6,493,633 B2 | 12/2002 | Baron, Sr. et al. | |
| 6,580,916 B1 | 6/2003 | Weisshaar et al. | |
| 6,617,964 B1 * | 9/2003 | Lamb | 340/286.02 |
| 6,650,902 B1 | 11/2003 | Richton | |
| 6,683,526 B2 | 1/2004 | Bellin | |
| 6,721,542 B1 | 4/2004 | Anttila et al. | |
| 6,745,021 B1 | 6/2004 | Stevens | |
| 6,751,455 B1 | 6/2004 | Acampora | |
| 6,753,784 B1 | 6/2004 | Sznaider et al. | |
| 6,766,163 B1 | 7/2004 | Sharma | |
| 6,785,551 B1 | 8/2004 | Richard | |
| 6,867,688 B2 | 3/2005 | Lamb | |
| 6,882,837 B2 | 4/2005 | Fernandez et al. | |
| 6,947,754 B2 | 9/2005 | Ogasawara | |
| 7,039,386 B2 * | 5/2006 | Kolsrud | 455/404.1 |
| 7,130,610 B2 * | 10/2006 | Dolezal et al. | 455/404.1 |
| 7,180,415 B2 * | 2/2007 | Bankert et al. | 340/539.17 |
| 7,224,957 B2 * | 5/2007 | Spector | 455/404.2 |
| 7,339,467 B2 * | 3/2008 | Lamb | 340/539.1 |
| 7,616,942 B2 * | 11/2009 | Karl et al. | 455/404.1 |
| 7,693,938 B2 * | 4/2010 | Weiser et al. | 709/203 |
| 2002/0095333 A1 | 7/2002 | Jokinen et al. | |
| 2002/0107016 A1 | 8/2002 | Hanley | |
| 2002/0124252 A1 | 9/2002 | Schaefer et al. | |
| 2003/0026240 A1 | 2/2003 | Eyuboglu et al. | |
| 2003/0134622 A1 | 7/2003 | Hsu et al. | |
| 2003/0134651 A1 | 7/2003 | Hsu | |
| 2003/0137415 A1 | 7/2003 | Thomson | |
| 2003/0145064 A1 | 7/2003 | Hsu et al. | |
| 2003/0197615 A1 | 10/2003 | Roche et al. | |
| 2004/0150518 A1 | 8/2004 | Phillips et al. | |
| 2004/0152493 A1 | 8/2004 | Phillips et al. | |
| 2004/0247086 A1 | 12/2004 | Menard et al. | |
| 2005/0030977 A1 | 2/2005 | Casey et al. | |
| 2005/0096065 A1 | 5/2005 | Fleischman | |
| 2005/0162267 A1 | 7/2005 | Khandelwal et al. | |
| 2005/0261012 A1 | 11/2005 | Weiser | |

FOREIGN PATENT DOCUMENTS

| | | |
|---|---|---|
| EP | 1032148 A2 | 8/2000 |
| EP | 1071296 A1 | 1/2001 |
| EP | 1515512 A2 | 3/2005 |
| JP | 09/098140 | 8/1997 |
| JP | 441719 | 9/1999 |
| JP | 10336127 | 12/1999 |
| JP | 2000165826 | 6/2000 |
| JP | 441720 | 8/2000 |
| JP | 2000244427 | 9/2000 |
| WO | 98/49661 | 11/1998 |
| WO | 96/05678 A1 | 2/1999 |
| WO | 00/30379 | 5/2000 |
| WO | 01/45061 A2 | 6/2001 |
| WO | 01/57724 A1 | 8/2001 |
| WO | 01/89150 A2 | 11/2001 |
| WO | 03/071392 A2 | 8/2003 |
| WO | 03/077063 | 9/2003 |
| WO | 2005/079421 A2 | 9/2005 |

OTHER PUBLICATIONS

Bharat Sanchar Nigam Limited, "Value Added Services in GSM", Engineering Instruction, May 4, 2005; available at http://www.bsnl.co.in/service/mobile_voice_based_service.htm.

British Parliament Debates CellAlert Service for the UK, May 1, 2003, may be seen at www.ceasa.us/news.htm.

Canadian Contract No. 5007441, Jul. 23, 2003; http://72.14.203.104/search?q=cache:piSqEswBv74J:strategis.ic.gc.ca/epic/internet/inet-td.

Canadians want Emergency-Location Services, by Dave Ebner, Apr. 11, 2003, may be seen at www.ceasa.us/news.htm.

CEASA International, "Public Warnings via Cell Broadcast", Wood and Weiser, May 24, 2005, http://www.ceasa-int.org.

CEASA International, "Welcome to CEASa USA", Ceasa Admin, Jun. 12, 2004, http://ceasa-international.com/usa/index2.php?option=comcontent&task=view&id=1&Ite.

CEASA, Cell Alert System Via Cell Broadcast, Wood, Sep. 2005, www.eglobalconf.net/speeches/MarkWood.ppt.

CEASA, "Text Message broadcasts could provide disaster Alerts" Jul. 28, 2005, available at: http://ceasa-international.com/usa/index2.php?option=comcontent&task=view&id=1&Ite.

CEASA; News and Events, "News", Jan. 14, 2005-Jun. 2005, http://www.ceasa-international.org/news.html.

Cellular Emergency Alert Services Association, Feb. 21, 2003, CellAlert Services Corporate Structure, may be seen at www.ceasa.us/news.htm.

CSEC "Wireless Implementation & Maintenance, Service Notification & Testing Notification Policies and Procedures", Apr. 19, 2002, available at: http://www.911.state.tx.us/files/pdfs/resources/call_take.xls.

Deaf Today, Disability Group Backs Cingular/AWS Merger, Silva, Jun. 4, 2004, available at: http://www.deaftoday.com/newsarchives/004848.html.

Engadget, "Dutch Testing Geo-Targeted SMS Emergency Broadcast System", Ricker, Oct. 8, 2005, http://www.engadget.com/entry/1234000590062252.

ETSI TS 123.246, Universal Mobile Telecommunications System (UMTS); Multimedia Broadcast/Multicast Service (MBMS); Architecture and functional description (3GPP TS 23.246 version 6.6.0 Release 6) (Mar. 2005).

Global Amateur Radio Emergency Communications Conference, Tampere, Finland, Jun. 13-14, 2005, What is 'Cell Broadcasting' and Why do I care, as a HAM?, Wood, www.rientola.fi/oh3ag/garec/documents/Cellalert.ppt.

International Search Report mailed Jul. 17, 2006 from the International Bureau.

International Telecommunication Union, "Cell Broadcast Broker System" M. Wood, Cell Alert Services Corp., Feb. 18, 2003, available at: http://www.itu.int/itudoc/itu-t/workshop/ets/isd3-001.html.

Messaging Network, Bercut Limited, "Broadcast for the Masses", Sergey Ermilov, Mar. 2, 2005, available at: http://www.bercut.biz.

MobileIN.com Perspective, "Cell Broadcasting Technical Primer", Wood, Sep. 2005, available at: http://www.mobilein.com/Perspectives/Authors/CB_Primer.htm.

MobileIN.com Perspective, "History and Importance of Cell Broadcast", Wood, Sep. 2005, available at: http://www.mobilein.com/Perspective/Authors/CB_HistoryImportance.htm.

News from Senator John Edwards, North Carolina, Apr. 3, 2003, Senate Okays Edwards Emergency Warning Bill, may be seen at www.ceasa.us/news.htm.

Newscientist.com, "Text Message Broadcasts Could Provide Disaster Alerts", Jan. 6, 2005, available at: http://www.newscientist.com/article.ns?id=dn6852.

OCG-EMTEL Archives, "Cell Broadcast Public Demonstration in USA Successful", Wood, Sep. 19, 2004, available at: http://list.etsi.fr/scripts/wa.exe?A1=ind0409&L=ocg_emtel&T=O&F=&S=&P=693.

RCR, Cell-Broadcast Service Gets Second Look, Jeffrey Silva, Nov. 10, 2003, May Be Seen At www.ceasa/us/news.htm.

Recommendation 12 (WTDC-02), The World Telecommunication Development Conference (Istanbul 2002).

SMS News, "Text Message Broadcasts Could Provide Disaster Alerts", Jan. 7, 2005, available at: http://www.sendsmsnow.com/newspage.php?id=44.

Stanford University, EE179 Introduction to Communications, Professor Andrea Goldsmith, Winter 2005, available at: http://www.stanford.edu/class/EE179.

TeliaSonera, "Mobile Broadcast/Multicast Service (MBMS)", MediaLab, Aug. 2004, available at: http://www.medialab.sonera.fi.

Text message warns of 'killer flu' hot spots, Apr. 20, 2003, may be seen at www.ceasa.us/news.htm.

The Cellular-Emergency Alert Services Association Policy Statement, Aug. 5, 2002, may be seen at www.ceasa.us/news.htm.

The Wall Street Journal Online, Local Governments Look at Cellphone-based Alerts, Carl Bialik, Jun. 12, 2003, may be seen at www.ceasa.us/news/htm.

Chinese Search Report, date of receipt Nov. 9, 2009.

Foreign Associate letter of Notification of the First Office Action dated Oct. 12, 2010 from State Intellectual Property Office of the People's Republic of China; Application Serial No. 200680051671.4 (letter dated Nov. 2, 2010).

\* cited by examiner

மையம் BROADCASTING CONTROL
SYSTEM AND METHOD

CROSS-REFERENCE TO RELATED APPLICATIONS

This application is a continuation of U.S. patent application Ser. No. 11/602,461 filed on Nov. 20, 2006, now U.S. Pat. No. 7,693,938, that claims the benefit of U.S. Provisional Application No. 60/739,819, filed on Nov. 23, 2005; and that further claims priority to U.S. patent application Ser. No. 11/057,704, filed on Feb. 14, 2005, now U.S. Pat. No. 7,752,259, that claims priority to U.S. Provisional Application No. 60/544,739, filed on Feb. 13, 2004. The disclosures of these applications are incorporated herein by reference.

FIELD

The present disclosure relates to message broadcast systems and in particular to the admission control for broadcasting messaging.

BACKGROUND

The statements in this section merely provide background information related to the present disclosure and may not constitute prior art.

With the events of Sep. 11, 2001, there has been increased concern with the ability of present systems for providing public service broadcasting of messages and warnings to the public. Existing public service warning systems are antiquated and provide only limited access to the public who may be in need of knowing of potential emergencies or danger. Additionally, existing systems do not provide for location-based notification or broadcasting messages.

As such, there is a need for an improved method and system for providing timely information to the public related to potential hazards affecting them. One suggested solution is the utilization of the subscription-based Short Message Service (SMS) messaging capability for mass messaging using mobile telephones and compatible devices. However, SMS systems and technology have significant technical limitations and experience with such systems has been disappointing due to significant delays in the delivery of SMS messages and negative impacts to the networks due to congestion. Additionally, SMS messaging places a considerable call processing load on the telecommunication system and infrastructure considering that the above process is multiplied by the demand of thousands or tens of thousands of SMS call set up requests at the same time. The potential initiation of broadcast SMS volumes will not only affect network resources for SMS messaging, but also negatively affect ability of the telecommunication networks to set up and support voice traffic during any period of message broadcasting as these resources are shared by both services.

SMS and Wireless Access Protocol (WAP) messaging systems utilize capacity on transmission channels making them unavailable for other purposes such as voice call set up and can only handle a limited number of SMS and/or WAP transmissions. As such, during heavy messaging, the related high volumes of messaging traffic may have a negative affect on other services including the set up of voice calls.

Generally, existing systems are not location-based and as such does not send messages to intended recipients located within a defined geographic location and therefore do not provide an attractive solution to location-based customer notification and other location-based broadcast services.

SUMMARY

The inventors hereof have succeeded at designing an improved admission control system and method for message broadcasting.

In one aspect, a message broadcasting control system providing a broadcast message to a broadcast target area, the system including a broadcast admission control module receiving the broadcast message record having a broadcast message, a defined broadcast target area, and a broadcast message originator identifier. The broadcast admission control module validating the broadcast message record as a function one or more of the broadcast message originator identifier, the broadcast target area, and a broadcast message transmission network parameter associated with a broadcast transmission network adapted for broadcasting the message to at least a portion of the broadcast target area. The broadcast admission control module generating a validated broadcast message record as a function of the validating. The system also includes a broadcast message distributor module receiving the validated broadcast message record and transmitting the broadcast message and the broadcast target area, or a part thereof, to an output interface distributing the broadcast message to at least a portion of the broadcast target area.

In another aspect, a method of broadcast messaging to a broadcast target area, the method including receiving a broadcast message record having a broadcast message, a defined broadcast target area, and a broadcast message originator identifier and validating the broadcast message record as a function one or more of the broadcast message originator identifier, the broadcast target area, and a broadcast message transmission network parameter associated with a broadcast transmission network broadcasting the message to at least a portion of the broadcast target area. The method also includes generating a validated broadcast message record as a function of the validating and transmitting the generated validated broadcast message record to an output interface.

In yet another aspect, a method of controlling broadcast messaging including authorizing a submission of a broadcast message to a broadcast target area that includes the processes of validating an authority of a broadcast message originator that originated a broadcast message record including the broadcast message and the broadcast target area as a function of a broadcast message originator parameter and identifying a broadcast transmission network providing broadcast message transmission to broadcast message receiving devices located within the broadcast target area. The method also includes validating the broadcast transmission network against a broadcast transmission network parameter and forwarding the broadcast message record to an output interface associated with the broadcast transmission network for transmission to the broadcast message receiving devices within the broadcast target area.

Further aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION

Figure 1:
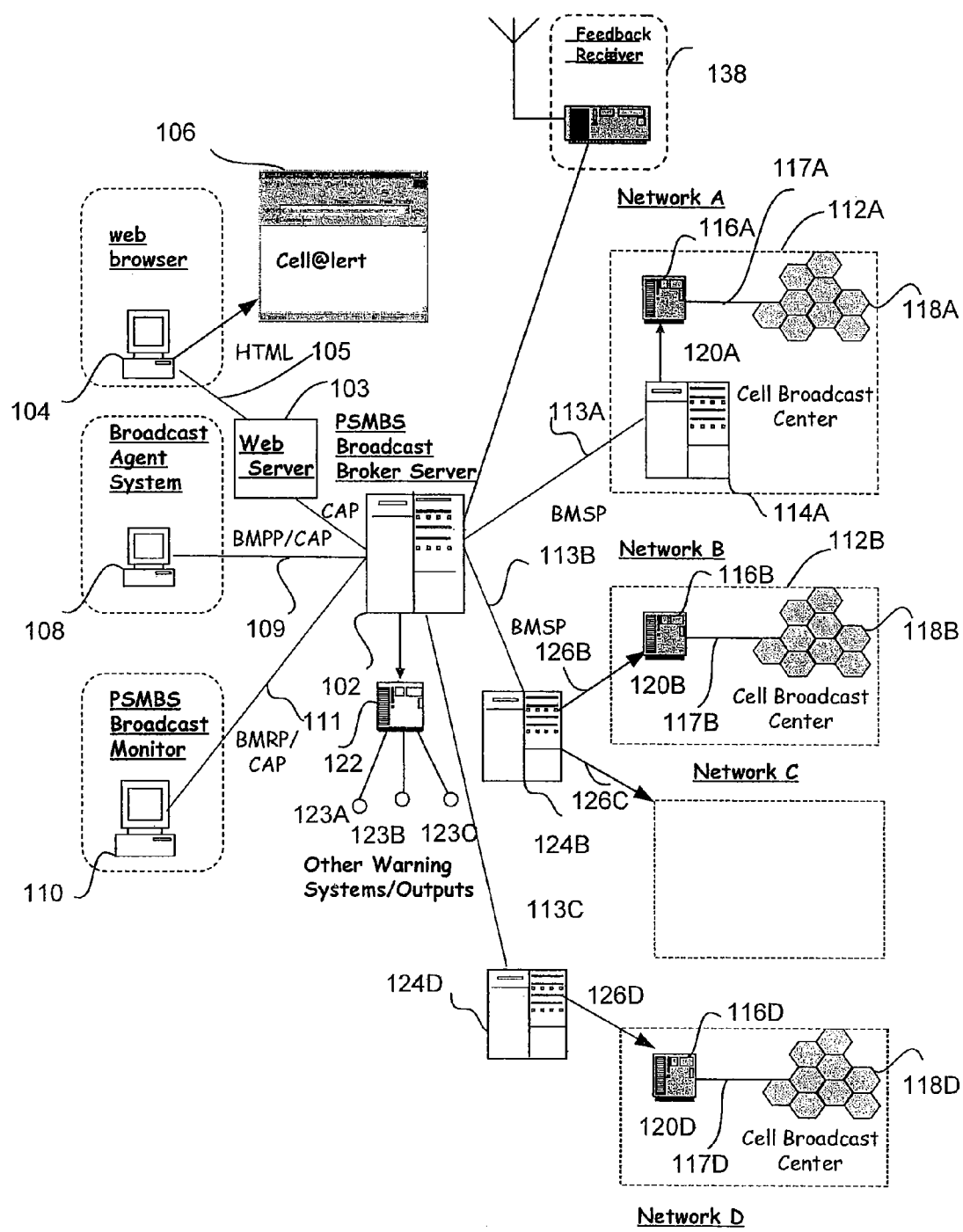
FIG. 1 is a functional block diagram of a public service message location broadcast system according to one embodiment of the invention.

The following description is merely exemplary in nature and is not intended to limit the present disclosure, applications, or uses.

The public service message location broadcasting system (PLBS) according to one or more embodiments of the invention provide for an improved system and method for public service broadcast messaging. A public service message location broadcasting system (PLBS) operator provides a Broadcast Agent Web Portal or Webpage or other similar Graphical User Interface (GUI), implementation and maintenance of the networks' cell-broadcast messaging components, networks and platforms, administration and operation of the public service message location broadcasting system, and interfaces to local telecommunication service providers including mobile unit service providers.

According to one embodiment in the event of a serious public emergency, a short text message is sent over the location broadcast channel. A mobile unit or Broadcast Agent phone, which is configured to receive location-based broadcast messages, while in the idle mode and located in the predefined cell, receives the broadcast message and displays the message on its screen.

Location-based message broadcasting is transmitted from the predefined cell in a downlink only mode and therefore, unlike current SMS services, does not require functionality or network resources from the mobile services provider or from any portion of the mobile service provider's mobility management resources, e.g., HLR, VLR, etc.

A public service message location broadcasting system provides for the simultaneous sending of public service messages to millions of subscribers with less impact on the supporting networks than a single SMS-message. As such, minimal to no network congestion will result.

A public service message location broadcasting system (PLBS) receives emergency or public service messaging and identification of the target broadcast area from public service or government entities. The PLBS provides location-based broadcast message enablement, security, multi-carrier interoperability and connectivity to the telecommunication service providers and other network operators offering services within the target broadcast area.

A public service message location broadcasting system and method according to one or more embodiments provides for the development, transmission, delivery and display of a message that is an official government-to-citizen information broadcast to all compatible telecommunication receiving devices in, or entering, a predefined at-risk geographic location or area.

The PLBS system sends any public service or emergency information associated with an event, as determined by authorized messaging entities that may affect public safety. These include, but are not limited to, utility outages, missing child alerts, severe weather warnings, flood warnings, and terrorist threat warnings. The messages are broadcast by public service message location broadcasting systems participating with local telecommunication networks and other local network operators.

Unlike other emergency messaging services that require the recipient's identity, a predetermined fixed delivery location, and usually the payment of a service fee, the public service message location broadcasting system uses broadcast messaging technology to reach an unlimited number of people in real time, with no pre-event recipient action required and to phones that are setup to receive the message channel.

The public service message location broadcasting system uses cell-broadcast SMS (C-BSMS) technology to provide a message or alert to a single cell geographic location, a neighborhood, a city, or an entire nation with minimal impact to participating telecommunication networks.

Local broadcast message network operators and/or telecommunications service providers, such as mobile or cellular telephone service carriers provide the local telecommunications infrastructure and interfacing technologies that enable the public service message location broadcasting system to transmit public messages in a timely manner to the public that may be at risk using standard and commonplace mobile telephone units.

The public service message location broadcast system and methods described herein provide the functions and steps necessary to ensure that the Broadcast Agents are authorized to send the requested broadcast messages to the defined broadcast target area. The PLBS configuration described herein provides internal controls for insuring that the network and components are secure and that messages are authorized prior to transmittal. The public service message location broadcast system provides the interface to the Broadcast Agents to ensure simple and timely definition of the broadcast target area, the message, and the authentication of the Broadcast Agent. The public service message location broadcast system also provides the interconnectivity and functionality for interfacing to participating telecommunication service providers and other PLBS systems that provide for the delivery of the broadcast message to the broadcast target area.

The public service message location broadcasting system consists of five parts:

1. Public Service Location Broadcast Service Bureau (PSMBs or PLBS)
2. Broadcast Agent Terminal/Web Portal/Web Page
3. Public Service Message Broadcast Controller/Distributor
4. Carrier Broadcast Center (CBC)
5. Public Service Location Broadcast Reporter One exemplary embodiment of a public service location broadcasting system (PLBS) 100 is illustrated in FIG. 1. A public service location broadcast service bureau 102, labeled In FIG. 1 as a PSMBS Broadcast Broker Server by way of example, includes interfaces to various system components and to the various networks in which a message can be broadcast to mobile units located with a defined target area or location.

One or more broadcast agent access devices 104 can be connected to the public service location broadcast service bureau 102 (PLBS-SB) and configured to provide a cell@lert display 106 to a Broadcast Agent. The cell@lert display, as described herein, includes an interface enabling the Broadcast Agent to input a message and define a geographic target area for delivery of the message. The cell@lert display 106 can be in the form of a webpage that is hosted by a Web Server 103 in service bureau 102 in an HTML format (as shown) or another web server (not shown). A Web Server 103 may also be remotely located at another facility. The Web Server interface to the PSMBS Broker Server uses the standard Cell Alert Protocol (CAP). In other embodiments, the Broadcast Agent Access Device 104 may be a computer or personal computer and the cell@lert display can be a display generated by locally supported software residing on the Broadcast Agent's personal computer. The broadcast agent access device 104 can be coupled to the service bureau 102 via any type of suitable data communication facility 105 using a variety of data communication protocols (not shown).

A broadcast commander 108, also referred to as a Broadcast Agent System or command module can be coupled to the service bureau 102 and provide administrative or "command" control over one or more operations of the PLBS system 100. A Broadcast Administrator or Operator can utilize the Broadcast Agent System 108 to set access limitations or restrictions on Broadcast Agents accessing the broadcast agent access device 104 as well as other administrative functions for the PLBS system 100. The interface between the Broadcast Agent System 108 and the service bureau 102 can utilize a broadcast messaging proprietary protocol (BMPP) or Cell Alert Protocol (CAP) that is transmitted over a communication facility or link 109. Such communication link 109 can be any type of communication facility suitable to support communications and can utilize any compatible communication protocol (not shown).

A PSMBS Broadcast Monitor 110, also referred to as the Cell Broadcast Reporter or the Broadcast Reporter System can also be coupled to the service bureau 102 and interface with the service bureau using a broadcast message reporting protocol (BMRP) or the standard cell alert protocol (CAP). The Broadcast Monitor 110 may be configured to store broadcast messaging data and to prepare and produce reports related to past, pending, and future broadcast messages in one or more areas. The Broadcast Monitor 110 may be located at a disaster management office, a control room, or the PLBS-SB 102.

The service bureau 102 can be communicatively coupled to one or more local carrier networks 112. While FIG. 1 illustrates two cellular carrier networks 112A and 112B connected to service bureau 102, in other embodiments, the service bureaus 102 can be coupled to a plurality of various communication networks, including, but not limited to cellular, wireless, wireline, satellite, wide area, metropolitan area, and local area networks, cable television networks, including a combination of public and/or private networks. A coupled network 112 may include a Cell Broadcast Center (CBC) 114 (or network broadcast module) that receives a broadcast message and local delivery instructions via a data communication link 113 from the service bureau 102. Such data communication link 113 can be any type of communication facility operating any one of a variety of suitable communication protocols capable of negotiating access and delivering the message to be broadcast. For example, as shown in FIG. 1, a broadcast message submission protocol (BMSP) can be utilized in the communication between the service bureau 102 and one or more of the networks 112. In another embodiment, CBC 114 B may be located at the PLBS center illustrated as CBC 124B and shared by smaller networks and interface to the switching center 116 (shown as 116B) located at network 112B. In another embodiment two CBCs are required at the PLBS to service two networks, Network C and Network D, as they have overlapping service areas that need to be uniquely accessed. In another embodiment the PLBS communicates with Other Warning Systems/Outputs 122 to warning systems 123A, 123B and 123C. These other warning systems may include alarms, sirens and dot matrix message boards but is not limited to these alternatives.

The Public Service Location Broadcast Service Bureau (PLBS-SB) 102 is located at a PLBS Operator's location which is preferably secure. The PLBS-SB 102 ensures the authenticity of the message and the authority of the sender to create such a message. Administrative Operators establish the User Profile in the Administration Subsystem to control Broadcast Agent rights and privileges. The signal from the Broadcast Agent Terminal 104, for example, at a police station, to the PLBS-SB 102, would only indicate the geographical area to be covered, plus the message. PLBS-SB 102 then sends the broadcast request signal to the Carrier Broadcast Center 114 at the office of each local carrier concerned.

PLBS-SB 102 may also perform a billing gateway administrative function as may be required to allocate PLBS service costs. PLBS-SB 102 can utilize stored location broadcast messaging data and may have access, in one embodiment, to the geographical coverage requested by the Public Service Broadcast Agent. PLBS-SB 102 may be configured to determine or calculate population density of the broadcast area. PLBS-SB 102 may also manage customer account data, authentication, security, and administration and application of restrictions on a customer, jurisdiction, or Broadcast Agent.

For each account, a Broadcast Agent Administrator is appointed and provided access to the Broadcast Agent System 108. A recognized authority, such as a police chief or city manager would be suitable for such a role, though he may likely delegate this to someone in the Information Technology services group. The Broadcast Agent Administrator (or his delegate) has under his control several Broadcast Agent accounts, which have authority under him, but no greater authority. For example, the jurisdiction of a Broadcast Agent is within that of a Broadcast Agent Administrator.

Using the PLBS-SB 102, an Administrative Operator checks and/or verifies the authenticity of the Broadcast Agent Administrator and defines or validates the jurisdictional area of the Broadcast Agent's organization. The Administrative Operator administers customer and agent profiles within the PLBS 102. The Administrative Operator has secure access for administering the operational and administrative data and profiles for operation of the PLBS-SB 102. Best practices and Memoranda of Understanding (MOU) are defined by government agencies and/or local carriers. For example, a Coast Guard commander may have access only to coastal areas, though the area would be very large. In another example, a River Authority manager would have a guideline indicating that he could warn of imminent flooding, but not urge people to conserve water usage. The river authority Jurisdiction may include only rivers, waterways and flood plains.

Any data and/or factor may be input to the PLBS-SB 102 by the Administrative Operator and used by the PLBS-SB 102 for system operation. Each Broadcast Agent Administrator has an account to which the Broadcast Agent belongs. The account is updated to indicate usage accumulated by the Broadcast Agent Administrator. Factors and data recorded include:

1. Language(s) for warnings
2. Broadcast Agent Administrator account holder contact details
3. Total number of messages broadcast
4. Total Pops reached
5. Mess-Pops figure (number of messages times the pops reached)
6. Log, (Each broadcast is recorded on the account for later review)
7. Date of contract expiration
8. Networks permitted for this Broadcast Agent Administrator
9. Channel numbers allowed
10. Message, Footprint and Broadcast libraries
11. Jurisdictional limits
12. Pop limits
13. Message length limits
14. Language for web portal
15. Report parameters and addresses
16. Admissions rules and operational events such as denials of service.

In some circumstances a report in the form of an e-mail or web-page may be sent or made available to the Administrative Operator and/or the Broadcast Agent Administrator. Such a report may include a warning that the account credit is about to expire, or the status of an account or activity. Such reports may be defined or requested or provided on a regular or specified interval.

Service may be automatically denied to a Broadcast Agent or Broadcast Agent Administrator who has exceeded his quota.

In other cases, information about account status may be signaled to the Broadcast Agent at log on and when proposing messages. This may cause the Broadcast Agent to think again about conserving his quota if near his limit.

The PLBS-SB 102 may also define a Broadcast Message Jurisdiction that is a geographical area for a particular Broadcast Agent Administrator and associated Broadcast Agents. Broadcast Message Jurisdiction may define any number of factors, data, or services. A first factor is a definition or allocation of geographic territory or areas to be accessed or displayed in map format to the Broadcast Agents of the Broadcast Agent Administrator. Additionally, all or a portion of the Broadcast Message Jurisdiction may be enabled or disabled for defining one or more broadcast message target areas or "Broadcast Target Area/Footprints" in which a public service broadcast message is to be sent. A second factor is the identification and specification of telecommunication local carriers (e.g., the networks 112) and other broadcast message networks that will be included in the messages originated by the particular Broadcast Agent Administrator or Broadcast Agent. This may also include defining one or more networks 112, network components (such as Carrier Broadcast Center 114 or network switching centers) or sub-networks to be provided the broadcast messages.

The Broadcast Agent Administrator is capable of setting further restrictions or rules related to its Broadcast Message Jurisdiction and one or more Broadcast Agents under its control or within its Broadcast Message Jurisdiction. For example, it may establish different levels of authority for various personnel within a police department or fire department or allocate sub-areas or sub-jurisdictions based on police or fire department sub-boundaries.

For each Broadcast Agent Administrator, the Broadcast Target Area/Footprint Library is generated and shared among the Broadcast Agents. However in some cases, the Broadcast Agent Administrator may wish to predefine Broadcast Target Area/Footprints on the basis of existing agreements. For example, these may include tornado watch boxes or mandated warning zones, such as around a chemical plant.

In this case, the Broadcast Agent Administrator has the option to allow some Broadcast Agents to access only the Broadcast Target Area/Footprint library, or to be able to use the library and the map tool. Other Broadcast Agents may have the authority to create new Broadcast Target Area/Footprints and store them in the library.

In some cases, the Broadcast Target Area/Footprint area may be complex. An advanced Footprint Library feature enables the Broadcast Agent to predefine areas to be covered, and store them in a library of Broadcast Target Area/Footprints specific to that Broadcast Agent. For example, the flood plain area of a river may be too complex to define with a simple mouse click. The definition of that broadcast target area should be done ahead of time, then recalled quickly when an urgent message is imminent. In another case, a tornado warning box is predefined based on political boundary and may be easier to refer to as such.

This feature may also be required if a particular Broadcast Agent only has authority to cover, for example, major highways or coastal areas such as beaches. These can be pre defined predefined by an Administrative Operator and then locked so that the Broadcast Agent has limited authority as to the Target Broadcast Area.

There is no limit on how many end-users one message can reach and in theory an authorized operator may send the message to everyone in the country at the same time. Since most authority is relatively limited, the account may be established on a per Broadcast Agent basis thereby determining the area to be addressed by one message. An Admission Control feature checks each new message for a pop figure before agreeing to proceed. If the pop figure check fails, the message is declined and the Broadcast Agent receives a message and report from the PSMBS Broadcast Monitor system 110 with an explanation. To continue, the Broadcast Agent can either set the area to one less ambitious (i.e., fewer pops), or request authorization from another Broadcast Agent with more pop authority. The pop figure may also be used to generate usage statistics that the administration system records for each Broadcast Agent. If a Broadcast Agent has exceeded the agreed limit, the account can be closed and an e-mail sent to the Broadcast Agent Administrator explaining this.

Control of pops is also provided for the local carriers 112 because the spacing of Radio Base Stations decreases with increasing population density. A dense urban area may be covered by more cells than the same corresponding area in a rural environment. From a signaling point of view, more cells are signaled for an area in the city than in the country. Therefore, the relationship between pops and network load should be considered. For example, the number of messages times the population targeted [Mess*Pops] is one possible unit for determining billing, since pop figures are directly available from the reports generated by account administration.

A Broadcast Message may consist of 15 82-character messages linked together. The standard default maximum size of a message may be that used by second generation GSM systems, which is 93 characters, or 82 octets of data. However, in practice each message should be less in order to support multiple language messages and for practical application reasons. The Broadcast Agent Administrator may set limits on the length of an individual message. The Broadcast Agent Administrator may also set a limit on how much in total has been sent by all of the Broadcast Agents within his control. An extended-message button on the advanced message dialogue box provides for setting further message contents as required. For future systems, messages may include multimedia messages such as photographs, audio files, short videos or maps, described as Multimedia Broadcast Message Services (MBMS) in next generation wireless technologies. In such a case, a multimedia facility dialogue box is utilized.

The Broadcast Agent Administrator may also predefine set messages in the message library, so that some accounts may broadcast only predefined messages. Others may be able to create their own messages and store them in the library. Past messages are also stored in the message library for later recall or repetition. Either from the advanced menu or from an advanced button on the quick message box, the Broadcast Agent can select the advanced message panel. Here the Broadcast Agent has many more options to control messages. For example, a particular message may be used frequently, or the precise wording of a message may have been approved at a higher political level in advance and only this wording broadcast. In such a case, the Broadcast Agent selects from a Message Library of standard messages available to this Broadcast Agent. The system stores past messages and is capable of retrieving them for re-transmission.

The system provides for the ability to repeat a message if the emergency continues for a long time, as the location broadcast message will only last for a limited period and be repeated. In other cases, the broadcast event may be triggered by an automatic machine such as a water level device. If so, the event triggers the predefined message as set up by previous agreements between the Broadcast Agent Administrator for that organization and the Administrative Operator who administers the accounts on the PLBS-SB 102 in accordance with guidelines agreed upon by government authorities and local carriers.

A Broadcast Proposal includes both the message and the Broadcast Target Area/Footprint together. In some cases both the Broadcast Target Area/Footprint and the message may be predefined by one group of Broadcast Agents giving other Broadcast Agents only the choice as to when to send the message. The Broadcast library also keeps copies of previously sent messages, and their Broadcast Target Area/Footprints, for fast recall and for internal management within the Broadcast Agent organization.

The system also provides for the broadcasting of public messages that are in several languages. In this case the Broadcast Agent will not be allowed to proceed until messages in the other languages have been compiled. Alternatively, the broadcast message may be sent in each language as each is entered. Otherwise translation servers can be signaled for a best effort translation. The account administration parameters will determine this.

In many cases, end users may be travelers from an area where a different language is the primary language. If so, by keeping separate channels for warnings in each language, the end user may receive a message in his own language. This may also be required in multilingual countries or portions of countries such as along a border. The PLBS Operator or Broadcast Agent Administrator may also be required by government authorities to send messages in more than one language. If so, the Administration system reminds the Broadcast Agent to open up messages for all the required languages. It will then link them together so that when one is recalled, they are all recalled together and treated as if the same message.

The Broadcast Agent may not be able to read and write the message in the other language, for example, he may not read Chinese or Arabic. In this case, he can go to the library of messages, which will automatically match the other language message. However this restricts the message to those not containing any variables.

If the Broadcast Agent decides to recall a message from the network and request that its broadcast cease, the linkage will ensure that all languages are recalled at the same time.

The system also provides for the specification of how long a single broadcast continues to be broadcast. For example, for many situations a 20-minute broadcast may be long enough, after which a new command to send the message again can be initiated. The PLBS system may provide for a default time to be set in the Broadcast Agent account. Additionally, in the advanced menu, options, the Broadcast Agent may be enabled to set start and stop times.

In other cases, Carriers or their networks 112 may require that the broadcast message have a start time and stop time specified to the cell 118. The message is held at the cell 118 and transmitted only when the start time arises, then transmission will be at regular intervals until the stop time arises, unless a command is received by the cell 118 to cease the message. As such, the PLBS includes a default start time that is set by the PLBS-SB 102 to be NOW, and the stop time to be 20 minutes. In some situations, the Broadcast Agent may have authority to set up messages for delivery at a predetermined time in advance, or to set the broadcast time for a longer or shorter time. For example, the Broadcast Agent may be planning a highway shutdown, and may pre-program the night's messages accordingly. This frees manpower at the busy command center at the very moment when attention may be needed on the radio and elsewhere.

In the advanced message window, a start and stop time box may appear which is set to the defaults. The Broadcast Agent has the option to change these, but as usual the administration system will check that the Broadcast Agent has authority to do so before proceeding with the message.

Channel codes define the type of message sent, which in turn defines the targeted message end user recipients. The subscriber end user who owns the terminal has to switch on or off the channels at his discretion. The account will define which channel codes are defaults for this Broadcast Agent and which are allowed.

The Broadcast message is preceded by a channel code. End users may be given the option to select the type of messages they want to receive by going through a menu on their phone. Some mobile phones are sold with the default state set to disable the receipt of messages. However, to enable mass distribution of broadcast message, the channel numbers are defined for the various message types.

In any case, the Broadcast Agent may have another special need in mind other than to address the public for warnings. The Broadcast Agent may, for example, want to address only police officers or neighborhood watch volunteers in the area. In other instances, there may be automatic equipment in the area which needs to be commanded to perform in a certain way in some conditions and locations, for example, sirens to sound. If so, a different channel number is defined.

If the Broadcast Agent has the authority, the channel number may be changed. In the simple version, the default is the standard code for public safety messaging. In any case, this code is checked against the Broadcast Agent profile by the Broadcast Agent Administrator before the message is sent to verify the authority of the Broadcast Agent.

In many areas, more than one official language is used. In such regions, people speaking one language, can be regularly crossing borders into countries which in themselves have multiple official languages, with message language priority in a different order. In other cases, such as the maritime service, information should be on the same code, regardless of which country the ship is near. Therefore, the system provides for the ability to transmit alert messages in all major official languages for a region. The system provides a mechanism to give the networks and governmental authorities flexibility in addressing this requirement.

End users may be required to activate one or more functions of their phone. The end user may be motivated to do that if he knows that he will get messages in his language. If the end user can speak more than one language, he can enable more than one code at his discretion. In addition, if the end user is a tourist or traveling businessman, he will get messages in his own language if that host country transmits them as such. For example, at airports, authorities may decide to transmit in English as well as the official languages, so as to warn passengers regardless if they speak the local language or not. Popular holiday resorts are another example.

Furthermore, there may be politically sensitive positions regarding which language is the first and which the second. In one embodiment, pre-assigning codes according the internationally recognized order specified in ISO 639 may be implemented. The use of 145 codes covers most languages (plus some spare for special cases). However, a network 112 may use the unused codes for other purposes. In any case since there are 1,000 codes available, this loss is a low price to pay in return for a good solution.

There are some cases where internationally agreed codes are required. One case in point is that of the maritime service channel. Many small pleasure craft and small coastal fishing vessels are not fitted with marine radio equipment. However, in many cases one of the occupants of the boat does have a mobile unit in their possession. Certainly most large ships do have a GSM installation. If so, the coastal authorities may decide to relay maritime safety information over a Citizen Band (CB) maritime service channel. If so, coastal shipping could switch on this channel. In that case, the channel number should be the same for every port the ship may visit, requiring an internationally assigned channel. In another example, the United Nations (UN) has the responsibility to care for the security concerns of all international relief workers working for them and any Non-Governmental Organizations (NGOs). If the UN Security Coordinator (UNSECORD) had a standard channel, then this highly mobile but very vulnerable group would be reachable on a geographically specific basis, but without having to change the channel number on their phone each time they change border. These two examples illustrate the benefits of the PLBS system 100 for supporting multi-border Broadcast Agents.

One embodiment of a message channel coding scheme consistent with the PLBS is provided in Appendix 1.

Figure 2:
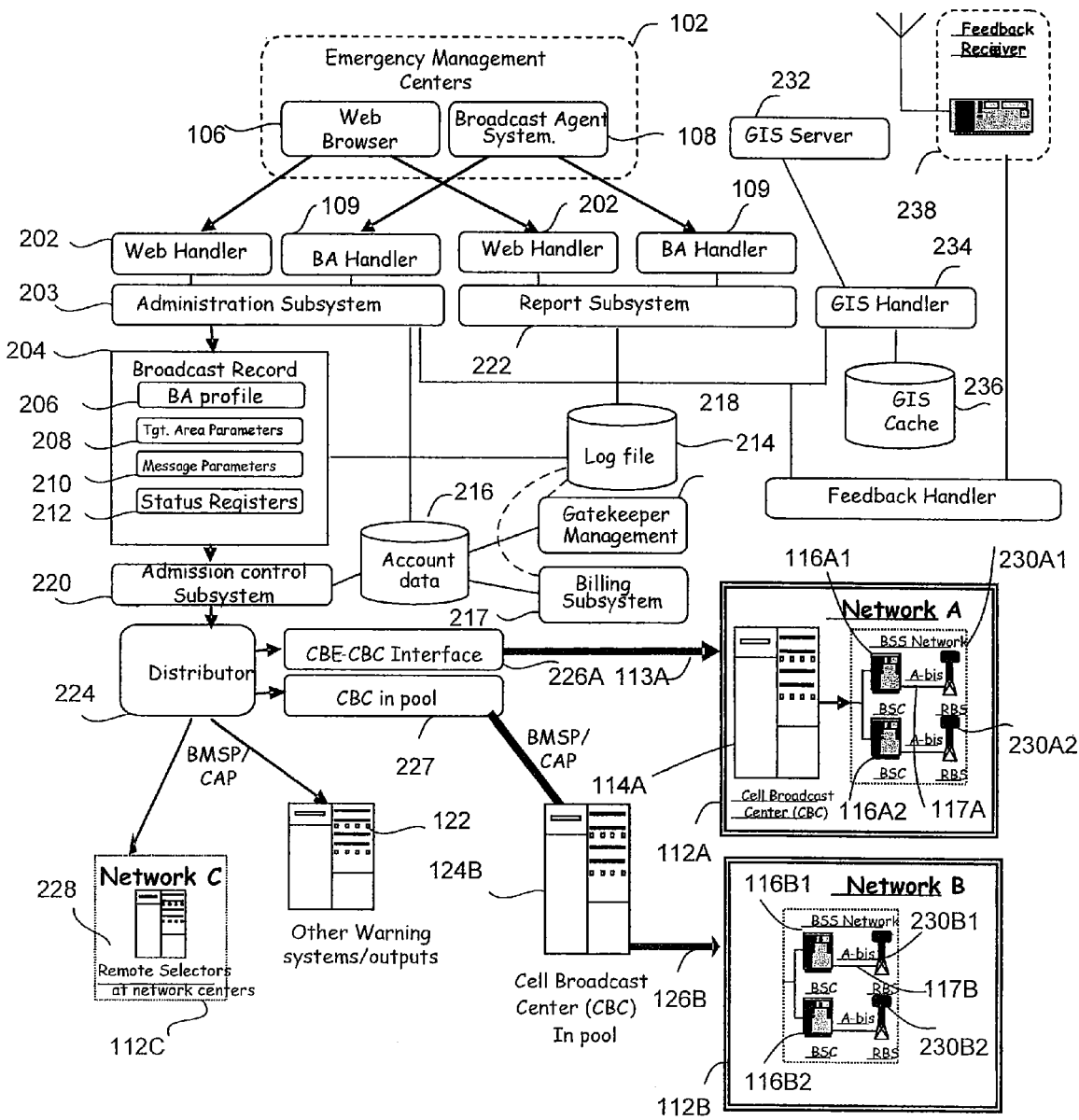
FIG. 2 is a second functional block diagram of a public service message location broadcast system according to one embodiment of the invention.

FIG. 2 illustrates another exemplary embodiment of the Public Service Message Location Broadcast System 200 along with expanded illustration of the service bureau 102 components and operations. In FIG. 2, the exemplary embodiment of the service bureau 102 illustrates the components and operations of creating and submitting a broadcast request by a Broadcast Agent, receiving authorization by the Service Bureau responsible for authenticating such requests and distributing the authorized message to participating networks 112A and 112B.

In this exemplary embodiment, the service bureau 102 hosts a web portal 202, such as indicated in FIG. 1 as webpage 106. The web portal 202 provides a man-machine interface to a Broadcast Agent utilizing a Broadcast Agent access device 104 (not shown). As shown, the web portal 202 receives from the account data database 216 through the Administration Subsystem 203 the Broadcast Agent (BA) profile 204 for each message entered for broadcast delivery. This can include any variety of user definable parameters and limits. For instance, as shown the message profile 204 can include a set of user parameters 206, broadcast target area footprint parameters 208, message parameters 210, and/or status register parameters 212. The user parameter 206 can include authorizations or limitations related to the Broadcast Agent and/or the Broadcast Agent Access Device 104. The footprint parameters 208 can include one or more geographic areas or locations in which the Broadcast Agent has defined for broad message delivery (broadcast target area) or a
selection of a predefined broadcast target area. The message parameters 210 can include limits or specification for each proposed message or on the total number of authorized messages or time limits for delivery of the message. Additionally, this can include a set of one or more predefined messages for selection by the Broadcast Agent. The status 212 can identify or define the status of the Broadcast Agent and/or previously proposed or submitted messages.

If a Broadcast Agent parameter permits an agent to create and store broadcast agent-created target areas, the Administration System 203 facilitates broadcast agent access to a geographic information system (GIS) server 232 using a GIS Handler 234 and permits the storage of the created target area and its associated coordinates in a GIS Cache 236. In one embodiment the GIS server 232 is a MAP Point server.

The service bureau 102 can also include a logfile 214 for logging access by each Broadcast Agent or by the Broadcast Administrator or Operator. Additionally, as this logfile 214 is held in a storage system or memory associated with the service bureau 102, the message profile 204 can be stored within the logfile 214. All broadcast messages are logged by the PLBS-SB 102 in the logfile 214 and cannot be tampered with by the Broadcast Agent or Administrative Operator. In the case of any dispute over a message, the Broadcast Agent Administrator, the Administrative Operator, and/or a government authority may view the log to establish what has occurred.

The logfile 214 may also be used for off line statistics and account administration. The reporting system 222 may send a copy by e-mail to the Broadcast Agent and/or Broadcast Agent Administrators if required. In some cases, billing can be derived from the message log and an off-line billing subsystem 217 program that would use agreed information to derive billing.

An account data database 216 can also provide stored information related to one or more accounts or Broadcast Agents utilizing or accessing the service bureau 102. Additionally, a gatekeeper management module 218 can provide for the management of access and system utilization by coordinating between the logfile 214 and the account data database 216.

An admission control 220 provides for security and management of each Broadcast Agent accessing the web portal 202 or other functions and systems of the service bureau 102. The admission control 220 receives the message profile 204 received by the web portal 202 and receives input from the account data database 216. Admission control 220 receives the message request that contains the proposed message as well as the broadcast target area. A Report Subsystem 222 generates reports for administration and operator review. Such reports can be stored and/or logged in the logfile 214.

A Distributor 224 receives the broadcast message request and maps the Broadcast Agent's broadcast target area to determine which broadcast distribution networks 112 or network service providers have networks providing broadcast distribution systems serving the broadcast target area. Once the distributor 224 has identified the broadcast distribution networks for the broadcast target area, it determines whether the broadcast distribution network 112 has its own Cell Broadcast Center 114 and an associated service bureau 102 (identified as CBE for Cell Broker Entity) to Cell Broadcast Center 114 (CBE-CBC) interface. The Presswood Algorithm is used to determine each transmission network's interface components and determines the appropriate communications protocol for each CBC.

As shown in FIG. 2, each network 112 having broadcast capable networks serving at least a portion of the broadcast target area receives the broadcast message and its associated parameters at its cell broadcast center 114. The cell broadcast center 114 also receives the coordinates for the broadcast target area in which the message is to be delivered. The cell broadcast center 114 identifies the network elements within its serving network associated with the broadcast target area and transmits the broadcast message to those network elements for appropriate transmission. In FIG. 2, the cell broadcast center 114A of network A 112A communicates the message to the network addresses to a broadcast switching center (or system) 116A for delivery and transmission over broadcast facilities 230A1 and 230A2, such as towers or antennas on a tower, by way of example. Similarly, a second network 112B may also provide service to some or all of the broadcast target area and also have broadcast facilities 230B1 and 230B2 that are addressed by network B's broadcast switching center 116B1 and 116B2. The broadcast switching center 116 can be any network element configured to support delivery and/or transmission of the broadcast message to a geographic or location specific user delivery device or broadcast facility 230. The broadcast facility 230 can be an antenna, a satellite, a fiber cable, a wireline system, or other network element capable of delivering the broadcast message to end users within the designated broadcast target area.

In operation, the Broadcast Agent utilizes the web portal 202 to define the broadcast target area. The service bureau 102 receives the message profile 204 entered by the Broadcast Agent and cleared or authorized by the admission control module 220. The distributor 224 identifies the networks providing service to the broadcast target area for the requested message. The distributor 224 sends the broadcast message along with a coordinate-defined broadcast target area over the CBE-CBC interface 226 to the appropriate cell broadcast centers 114. The cell broadcast center 114 determines the network elements providing service to the defined broadcast target area and identifies the network addresses thereof. The cell broadcast center 114 transmits the broadcast message within the network 112 over a local facility to a broadcast switching center 116.

In one alternative exemplary embodiment, the network service provider for the particular network 112 may have designated the service bureau 102 to provide the required broadcast message network routing for delivery of the broadcast message within the network service provider's network 112. As shown in FIG. 2, the network 112C includes a remote selector 228 rather than a cell broadcast center 114. In this case, the service bureau 102 maps the broadcast target area into network addresses for direct network addressing of the broadcast messages for network routing through the remote selectors 228 and to ultimately be delivered to end users within the broadcast target area served by the network provider 112C. The remote selector 228 receives the network addressed broadcast message and delivers the message using the network addresses to the associated broadcast facility (not shown) in the network 112C that serves the broadcast target area.

The Broadcast Agent requires the permission of the local carrier to use their network for this purpose. The administration of individual accounts is provided to the Administrative Operator to define network guidelines for each Broadcast Agent Administrator. For each Broadcast Agent Administrator, the carriers that have agreed to carry his traffic are signaled individually. Each Broadcast Agent Administrator is provided with the ability to customize the interface between the various networks 230A, 230B and 230C (not shown) to match the protocols or business requirements of the carriers.

The message is transmitted to the carrier for broadcast transmission over their network. In most cases, the message is transmitted to every known operator offering coverage of the area and may include mobile carriers, digital private radio systems operators, private radio system operators, internet service providers, wireline telecommunication service providers, satellite service providers, CATV operators, etc.

The PLBS-SB 102 sends a copy of the message and geographical information about the required Broadcast Target Area/Footprint to each operator's network center 112A, 112B and 112C for further processing by the Carrier Broadcast Center (CBC) to determine which cells are involved, then send the signals to the correct switching center or Gateway platform. Some messages may be intended only for the private digital radio system used by the organization such as a police radio network. In other cases, sending a multimedia message such as a map or photo to a text-capable second generation 2G networks may not be applicable.

Carriers or telecommunications operators may decline to accept messages from a message source, or of a particular subject matter, context, or content. In each case, the networks which have been selected may be checked by a Gatekeeper Administration Subsystem 218 or Administrative Entity before the message is transmitted.

In some cases the Broadcast Agent may decide to recall the message before it has elapsed its time. In this case, the Broadcast Agent will select the message from the message library and click or press the recall button. Administration sends the recall command to the concerned networks or carriers.

Emergency situations are very dynamic, and the situation may change shortly after sending the message and before the expiration of the message time. If so, the PLBS system 100 provides the Broadcast Agent with the ability to recall the message. The PLBS system 100 also includes a recall button to recall the message as displayed in the window. Each message is given a daily number for fast recall purposes.

The Broadcast Agent may wish to confirm that the broadcast has indeed been passed to the networks for broadcasting. This confirmation can be by an e-mail or a report box on the browser from the report subsystem 222 or other administration reporter. Additionally, the reporter subsystem 222 can transmit copies to other connected systems or monitoring centers (not shown).

Since the actual broadcast is managed by each participating local carrier through the carrier's network of gateways and switches, the PLBS-SB 102 does not have any further influence on the process after the message/target broadcast information has been sent to the participating carriers cell broadcast center 114. Therefore, any message broadcast progress information passed back is only valid up to the moment of information handoff to each participating carrier.

The report system 222 can send a pop-up window back, to the Broadcast Agent provided he has not logged off the PLBS system 100. This report can show ticks indicating that the message was handed off to the participating networks 112. However, it does not indicate that the message is actually being transmitted in real-time. Optionally the report system 222 can send an e-mail to the Broadcast Agent Administrator to inform him that messages have been sent. Should any irregularities occur or other trigger events, such as the near exhaustion of agreed messages, then a report can be sent to the Broadcast Agent Administrator's e-mail address reporting this.

Reports may be automatically generated as plain text messages and sent to an electronic address or e-mail account defined by the Broadcast Agent Administrator and/or Administrative Operator.

The Web Portal 202, as hosted directly or indirectly by the PLBS Service Bureau 102, communicates with a Web Browser 106 at the Broadcast Agent's location, as discussed below. The objective of the Web Portal 202 is the creation of a Broadcast Request, a file which holds the following information.

a. Broadcast Target Area/Footprint
b. Message and related parameters
c. User Parameters (e.g., Broadcast Agent User ID and Password)
d. Status of the Broadcast Request, (times Proposed, Authenticated, Handed off) and status reports.

The Admission Control Subsystem 220 ensures that the proposed Broadcast Request by the particular Broadcast Agent at this time is authentic before passing it to the participating networks 112A, 112B, and 112C.

For the Broadcast Agent and session, the Web Portal 202 provides an environment for the Broadcast Agent consisting of the maps of his jurisdiction, the Broadcast Target Area/Footprint, message and broadcast libraries that apply. The Web Portal 202 gets this information from the account data database 216. When the Multi-Language feature is required, appropriate windows are provided in the message window.

The Broadcast Agent Web Portal 202 creates a Broadcast Request record with the name, the current system date and time from when the Create Message button was pressed.

When the Broadcast Agent clicks the GO-button, the Admission Control Subsystem 220 fetches a Broadcast Agent profile from the account data database 216. It checks all the parameters of the Broadcast Agent and message to determine if the message will be admitted or declined.

When a message is declined, the Broadcast Record is marked as such by its status register 212 and sent to reporting. A report is then generated and e-mailed as per the parameters in the account data database 216. The Broadcast Record is then stored along with the reports in the broadcast logfile 214. The Broadcast Agent creates a new broadcast that has a new number.

The Broadcast Agent ID and password details are checked against the profile to authenticate the Broadcast Agent. If not authentic, the message is declined. Admission Control 220 will then check the Broadcast Target Area/Footprint against the profile. If not within the Jurisdiction the message will be declined. Admission Control 220 then calculates the Pops figure for this message by multiplying the area derived from the Broadcast Target Area/Footprint, by the population density. Population density figure data is fetched from account data database 216. The [total messages], [Pop density], and [total mess*pop] figure is then fetched from the account data database 216, and the new figure is added in the broadcast record but not written into the account data database 216. The total result is checked against the limits set in account data database 216. If the limit is exceeded, then the admission rules are checked to see if the broadcast may be sent. If not, the message is declined. Alternatively, a report may be generated according to the admission rules.

Multi-language messaging checks may be performed to see if the Broadcast Agent has defined a message for each language as required by the government authorities. If not then the Broadcast may or may not be declined according to admission control rules.

The networks requested are checked against the account data database 216. The Web Portal 202 may have participating networks 112 that the account data database 216 has defined, however in some cases some networks may accept some channels while others do not. If so, the broadcast may continue on the allowed networks and declined on others, or it may be declined altogether.

If Admission Control 220 is satisfied that the Broadcast Request is valid, then it is sent to the Distributor 224.

The Admission Control 220 ensures that that any Broadcast Request meets with the approval based on preset guidelines. The parameters as to what is acceptable and what is not are set by the Administrative Operator in the account data database 216. Each registered Broadcast Agent, that is everyone who is allowed to create Broadcasts, has a separate Profile recorded in the Administration Database. Only the Administrative Operator has access to this file and can create, edit and delete Broadcast Agents. All Broadcast Agents belong to a Broadcast Agent Administrator, and may not have authority exceeding their Broadcast Agent Administrator.

The parameters used in the Administration Data Base are reviewed in the PLBS-SB 102 System description document. There are other parameters about the User ID, the Broadcast Agent Administrator to whom the Broadcast Agent reports, and the current password and authentication key for each Broadcast Agent that may also be included.

The Administration Subsystem is responsible for creating an object called the Broadcast Request. This file details everything known about each proposal. It also contains a check list of flags that are used by the system to track the progress of each Broadcast Request. A Broadcast Request is known by a unique ID consisting of the PLBS-SB 102 that accepted the proposal, and the date time group identifying when it was accepted as a valid proposal.

When the Broadcast Agent clicks the "propose" or "GO" button, the Gatekeeper Administration Subsystem will check that the Broadcast Request has been created with enough required information, and is formatted correctly. When the Proposal is correctly formatted, it is recorded in the logfile 214 data base, in an area where pending proposals are kept. The Administration Subsystem then orders the Admission Control 220 system to run.

Once Admission Control 220 has authenticated and approved the transmission of the Broadcast Request, the message and broadcast target area information is submitted to the Distributor 224 for transmission to Participating Networks 112 for message distribution. If the carrier has provided its facility, network addresses or location coverage area data to the PLBS-SB 102, the Distributor 224 converts the target area map parameters entered by the Broadcast Agent into a network addresses and transmits the message parameters and associated network addresses to the carrier via the carrier's Carrier Broadcast Center 114.

For carriers that elect not to provide the PLSB-SB 102 the details of the networks including the network facility addresses, the Distributor 224 transmits the message and the target broadcast area coordinates of the target broadcast area to the carrier. The carrier performs the required conversions of target broadcast area to network or location addresses, such as cell site identifiers.

The network facility selector function managed by the Distributor 224 can be supported via predefined network facility service pools, e.g., so that predefined message target broadcast areas and their associated network facility identifiers can be expeditiously processed by each carrier.

The PSMBS system 200 is shown with a feedback receiver that functions to send a "heartbeat message" on a separate heartbeat channel on a regular basis. This "heartbeat" consists of a short text message indicating the sending agent identity and a date time stamp or origination. This heartbeat message is used so that citizens can verify and test their terminal receiver settings and confirm the system is working.

A feedback receiver is typically placed in a given service area and programmed to receive PSMBS and heartbeat messages off-air and send them to the feedback reporting system in the PSMBS Broker System. A feedback reporting system makes copies of the reports and sends them to agents, administrators and an event monitoring system, so that agents can confirm when the messages they originated appear over the air. The event monitor is aware when regularly scheduled feedback "heartbeat messages" are scheduled to occur. If the feedback messages do not occur, a report is generated and sent to agents and administrators pertaining to that area of jurisdiction, and/or to the monitoring centers.

In some embodiments, a message broadcasting system providing a broadcast message to a broadcast target area includes a broadcast request interface, a broadcast admission control module, and a broadcast message distributor module. The broadcast request interface is configured for receiving a broadcast message record having a broadcast message, a defined broadcast target area, and a broadcast message originator identifier. The broadcast admission control module is configured for receiving the broadcast message record and validating the broadcast message record as a function one or more of the broadcast message originator identifier, the broadcast target area, and a broadcast message transmission network parameter associated with a broadcast transmission network adapted for broadcasting the message to at least a portion of the broadcast target area. The broadcast admission control module is also configured for generating a validated broadcast message record as a function of the validating. The broadcast message distributor module is configured for receiving the validated broadcast message record and transmitting the broadcast message and the broadcast target area, or a part thereof, to an output interface configured for distributing the broadcast message to at least a portion of the broadcast target area.

In some embodiments, the system includes a broadcast network interface module coupled to the broadcast message distributor module for receiving the broadcast message record and forwarding the broadcast message record to a broadcast network transmission module associated with at least one of the broadcast message transmission networks.

In some embodiments, the system can also include a broadcast network transmission module associated with at least one of the broadcast message transmission networks and coupled to one of more network transmission components within the at least one broadcast message transmission network configured for transmitting the broadcast message to broadcast message receiving devices within the broadcast target area.

In some embodiments, the broadcast network transmission module is configured for receiving the validated broadcast message record and determining at least one network transmission component address as a function of the broadcast target area within the validated broadcast message record and transmitting the broadcast message to the network transmission component having the component address for transmission to the broadcast message receiving devices.

In some embodiments, the broadcast network transmission module is dedicated to one particular broadcast message transmission network.

In some embodiments, the broadcast network transmission module is configured as a service bureau and coupled to a plurality of broadcast message transmission networks.

In some embodiments, the output interface is configured for transmitting the validated broadcast message to a second broadcast request interface associated with a second broadcast admission control module associated with a second message broadcasting system.

In some embodiments, the broadcast message interface is configured for hosting a web page and generating the broadcast message record in response to data entered by a broadcast message originator accessing the hosted web page.

In some embodiments, the broadcast message interface is configured for presenting a broadcast message originator with a geographic area and enabling the broadcast message originator to define the broadcast target area as a subset of the presented geographic area.

In some embodiments, the geographic area is presented as a graphical map and wherein the broadcast message interface is configured for enabling the broadcast message originator to graphically define the broadcast target area on the presented graphical map.

In some embodiments, the broadcast admission control module verifies an authority of the broadcast message originator as a function of a broadcast message originator authorization parameter, said transmitting the broadcast message being responsive to the authority verification.

In some embodiments, the broadcast admission control module is configured for validating including validating the authority of a broadcast message originator as a function of a broadcast message originator parameter.

In some embodiments, the broadcast message originator parameter includes one or more of an authorized broadcast message originator identification code, a message priority, an authorized password, an authorized message target broadcast geographic area, a geographic broadcast area authorization flag or parameter, a reusable geographic broadcast target area template definition authorization parameter, an authorized broadcast network distribution parameter, a broadcast message profile parameter, a message language text parameter, and a geographic broadcast target area message language priority parameter.

In some embodiments, the broadcast admission control module is configured for validating includes identifying a broadcast transmission network providing broadcast message communications to broadcast message receiving devices within the broadcast target area and validating the broadcast transmission network against a broadcast network parameter.

In some embodiments, the broadcast network parameter includes one or more of a reusable geographic broadcast target area template definition parameter, a broadcast message target area parameter, a message priority, a message language text format parameter, a network authorization parameter, and a message language priority indicator.

In some embodiments, the broadcast admission control module is configured for identifying one or more broadcast transmission networks providing broadcast message communications to broadcast message receiving devices located within the broadcast target area and validating at least one of the identified broadcast transmission networks against a broadcast transmission network authority parameter.

In some embodiments, the broadcast admission control module is configured for identifying a first broadcast transmission network providing broadcast message communications to broadcast message receiving devices within the broadcast target area is repeated to identify a second broad network providing broadcast message communications to other broadcast message receiving devices within the broadcast target area in response to forwarding the broadcast message to a broadcast transmission network, wherein the broadcast admission control module validates the broadcast transmission network includes validating a first and a second broadcast transmission network against first and second broadcast transmission network parameters, respectively, and forwards the broadcast message to the first broadcast transmission network and the second broadcast transmission network for transmission to broadcast message receiving devices within the broadcast target area.

In some embodiments, the broadcast admission control module is configured for validating the broadcast message record against a plurality of broadcast transmission network parameters, wherein the broadcast transmission network parameters are associated with a particular broadcast transmission network.

In some embodiments, the broadcast admission control module is configured for receiving a plurality of broadcast message records from a plurality of broadcast request interfaces and the validated broadcast message record is a first broadcast message record having a first broadcast message and a first broadcast target area and the broadcast network is a first broadcast transmission network, and wherein the broadcast admission control module is further configured for validating a second broadcast message record in response to completing the forwarding of the first broadcast message to the first broadcast transmission network for transmission to the broadcast message receiving devices within the first broadcast target area.

In some embodiments, the broadcast admission control module is configured for selecting the second broadcast message record from among a plurality of broadcast message records as a function of a message priority parameter.

In some embodiments, the broadcast request interface is configured for receiving a broadcast message request indicating a broadcast originator suspension notification and the broadcast admission control module is configured for validating a subsequent broadcast message record indicating that all broadcast transmission networks decline the transmission of the subsequent broadcast message.

In some embodiments, the broadcast admission control module is configured for initiating the reporting and sending of the subsequent broadcast message record to a message broadcast system administrative account.

In some embodiment, a method of broadcast messaging to a broadcast target area including hosting a broadcast message interface and receiving a broadcast message record having a broadcast message, a defined broadcast target area, and a broadcast message originator identifier. The method also includes validating the broadcast message record as a function one or more of the broadcast message originator identifier, the broadcast target area, and a broadcast message transmission network parameter associated with a broadcast transmission network configured for broadcasting the message to at least a portion of the broadcast target area. The method further includes generating a validated broadcast message record as a function of the validating and transmitting the validated broadcast message record to an output interface configured for distributing the broadcast message to at least a portion of the broadcast target area.

In some embodiments, the broadcast message interface is configured for presenting a broadcast message originator with a geographic area and enabling the broadcast message originator to define the broadcast target area as a subset of the presented geographic area.

In some embodiments, the hosting includes hosting a webpage and presenting a map of an area having a plurality of definable broadcast target areas and includes an interactive user interface for receiving broadcast message originator input to define the broadcast target area with reference to the presented map.

In some embodiments, the hosting includes providing the interactive user interface with a graphical mapping capability for enabling the broadcast message originator to define the broadcast target area having a user definable shape.

In some embodiments, the hosting includes hosting a data network interface configured for receiving the broadcast message record transmitted from a coupled second broadcast message system.

In some embodiments, the validating includes verifying an authority of a broadcast message originator as a function of a broadcast message originator authorization parameter and the broadcast target area.

In some embodiments, the broadcast message originator authorization parameter includes a geographic parameter defining an area in which the broadcast message originator is authorized to originate a broadcast message contained within the broadcast message record.

In some embodiments, the transmitting the broadcast message to the output interface is responsive to the authority verification.

In some embodiments, the transmitting includes transmitting the broadcast message and broadcast target area to one of a plurality of broadcast transmission networks serving, at least in part, the broadcast target area as a function of a message admission control parameter associated with the one broadcast transmission network.

In some embodiments, the method includes transmitting at least one area identification parameter within the message target broadcast area to at least one network broadcast center.

In some embodiments, the method includes transmitting a report containing the broadcast message, the broadcast target area and the at least one area identification parameter within the message broadcast target area.

In some embodiments, the method includes identifying one or more broadcast transmission networks providing broadcast message communications to broadcast message receiving devices located within the broadcast target area, wherein validating includes validating one of the identified broadcast transmission networks against a broadcast transmission network authority parameter.

In some embodiments, the method includes identifying a first broadcast transmission network providing broadcast message transmission to first broadcast message receiving devices served by the first broadcast transmission network and within the broadcast target area and identifying a second broadcast transmission network providing broadcast message transmission to second broadcast message receiving devices served by the second broadcast transmission network and within the broadcast target area, wherein validating includes validating the first and the second broadcast transmission networks against first and second broadcast transmission network parameters, respectively, and transmitting includes forwarding the broadcast message to the first broadcast transmission network and the second broadcast transmission network for transmission to the served broadcast message receiving devices located within the broadcast target area.

In some embodiments, the validating includes comparing the broadcast message record against a plurality of broadcast transmission network parameters, wherein the broadcast transmission network parameters are associated with a particular broadcast transmission network.

In some embodiments, the receiving includes a plurality of broadcast message records from a plurality of broadcast request interfaces and validating including validating a first broadcast message record having a first broadcast message and a first broadcast target area and a second broadcast message record having a second broadcast message and a second broadcast target area, and wherein transmitting includes transmitting the first validated broadcast message record to a first output interface associated with a first broadcast transmission network and transmitting the second validated broadcast message record to a second output interface associated with a second broadcast transmission network.

In some embodiments, the method also includes selecting the second broadcast message record from among the plurality of broadcast message records as a function of a message priority parameter.

In some embodiments, the validating includes identifying a broadcast transmission network providing broadcast message communications to broadcast message receiving devices within the broadcast target area and validating the broadcast transmission network against a broadcast network parameter.

In some embodiments, the broadcast network parameter includes one or more of a reusable geographic broadcast target area template definition parameter, a broadcast message target area parameter, a message language text format parameter, a network authorization parameter, and a message language priority indicator.

In some embodiments, the method can also include receiving a broadcast message record indicating a broadcast originator suspension notification, validating a subsequent broadcast message record, declining the transmission of the validated broadcast message record, and initiating the reporting of the declined broadcast message record to a broadcast system administrative account.

In some embodiment, a method of admission control for authorizing a submission of a broadcast message to a broadcast target area includes receiving a broadcast message record including the broadcast message and the broadcast target area for the broadcast message and validating the authority of a broadcast message originator originating the broadcast message record as a function of a broadcast message originator parameter. The method also includes identifying a broadcast transmission network providing broadcast message transmission to broadcast message receiving devices located within the broadcast target area and validating the broadcast transmission network against a broadcast transmission network parameter. The method further includes forwarding the broadcast message record to an output interface associated with the broadcast transmission network for transmission to the broadcast message receiving devices within the broadcast target area.

In some embodiments, the method can also include identifying one or more broadcast transmission networks providing broadcast message transmissions to broadcast message receiving devices located within the broadcast target area and validating at least one of the identified broadcast transmission networks against a broadcast transmission network authority parameter.

In some embodiments, the identifying includes identifying a first broadcast transmission network providing broadcast message transmission to first broadcast message receiving devices served by the first broadcast transmission network and within the broadcast target area and identifying a second broadcast transmission network providing broadcast message transmission to second broadcast message receiving devices served by the second broadcast transmission network and within the broadcast target area, wherein validating includes validating the first and the second broadcast transmission networks against first and second broadcast transmission network parameters, respectively, and transmitting includes forwarding the broadcast message to the first broadcast transmission network and the second broadcast transmission network for transmission to the served broadcast message receiving devices located within the broadcast target area.

In some embodiments, the validating the broadcast transmission network includes validating the broadcast message record and broadcast transmission network against a plurality of broadcast transmission network parameters.

In some embodiments, the method can include comparing the broadcast message record to a broadcast transmission network decline parameter in response to a failure of validating against one of the plurality of broadcast transmission network parameters and at least one of generating a warning message in response to a failure in the comparing to the broadcast transmission network decline parameter and generating a decline report in response to a success in the comparing to the broadcast transmission network decline parameter.

In some embodiments, the method can include storing the submitted broadcast message record to a broadcast message log file.

In some embodiments, the can include generating a security report in response to a failure of the validating of the broadcast message record.

In some embodiments, the validating includes retrieving a broadcast message originator parameter from a data base and comparing the broadcast message originator parameter against an authorization parameter.

In some embodiments, the broadcast message originator parameter includes one or more of an authorized broadcast message originator identification code, an authorized password, an authorized message target broadcast geographic area, a message priority, a geographic broadcast area authorization flag or parameter, a reusable geographic broadcast target area template definition authorization parameter, an authorized broadcast network distribution network parameter, a broadcast message profile parameter, a message language text parameter, and a geographic broadcast target area message language priority parameter.

In some embodiments, the broadcast network parameter includes one or more of a reusable geographic broadcast target area template definition parameter, a broadcast message target area parameter, a message priority, a message language text format parameter, and a message language priority indicator.

In some embodiments, validating can include validating the broadcast message record against an authorized message parameter associated with the broadcast network, wherein forwarding the broadcast message record is in response to successfully validating the broadcast message for the broadcast network.

In some embodiments, the method can also include setting a message decline flag for the message transmission to the broadcast network in response to a failure of the validating the broadcast transmission network against a broadcast network parameter.

In some embodiments, the method can include setting a message admission done flag and logging the completed message submission to the message log file in response to completion of the admission control procedure for all of a plurality of broadcast message transmission networks.

In some embodiments, the method can include initiating the admission control method for a second broadcast message record in response to the successful forwarding of a first broadcast message record.

In some embodiments, the method can include selecting the second broadcast message record from among a plurality of broadcast message records as a function of a message priority parameter.

In some embodiments, the validating includes comparing a parameter associated with the broadcast message record to a stored authorization parameter.

In some embodiments, the receiving includes receiving a plurality of broadcast message records from a plurality of broadcast request interfaces and wherein the validated message record is a first broadcast message record having a first broadcast message and a first broadcast target area and the broadcast network is a first broadcast transmission network, further comprising validating a second broadcast message record in response to completing the forwarding of the first broadcast message to the first broadcast transmission network for transmission to the broadcast message receiving devices within the first broadcast target area.

In some embodiments, the method can include generating a security report in response to a failure of validating the broadcast message record.

Figure 3:
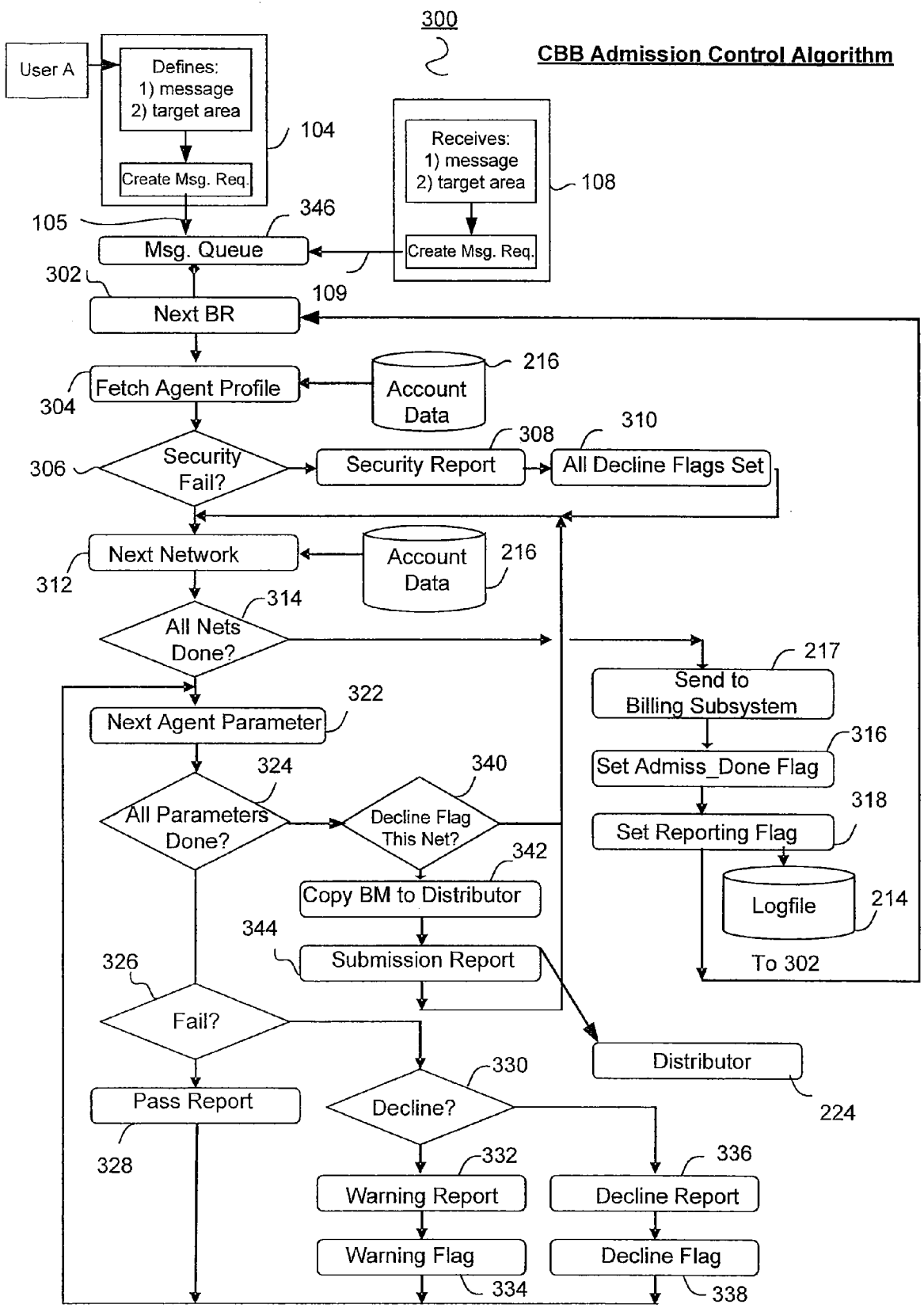
FIG. 3 is a flow chart for an admission control process within the public service message location broadcast system service bureau according to one embodiment of the invention.

Referring to FIG. 3, the illustrated admission control method 300 (also referred to as the Haslemere algorithm) uses the convention of having a yes answer coming out of the side, and a no answer from the bottom is applicable unless otherwise indicated.

The method 300 starts at a Next Broadcast Agent Message Request (BR) process 302. BR messages are held in a message queue 346 and may be received from broadcast agents on site or from a remote Broadcast Agent System. Messages held in queue are sequenced by predefined message priority codes that are included within the submitted broadcast message request.

Next a Fetch User Profile or Fetch Agent Profile process 304 provides that the User ID/Agent ID is read and the Broadcast Agent profile is fetched from the Administration Data Base such as account data database 216.

The next process is a Security Fail process 306 that provides that the User ID is checked against the password and authentication key entered in the database. (The Administration Control system has validated the data link and network address of the originating terminal in the case of secure tunneling or Virtual Private Network or VPN access).

A Security Report process 308 provides that if the security check fails in process 306, a short message explaining the reason for the failure is generated. The short message is appended to the report field for this Broadcast Message request. In the case of a security offense or alert, additional data may be included such as details related to the attempted action.

In an All Decline Flags Set process 310, to avoid a transmission of this Broadcast Agent Message, a Decline Flag is set for a Broadcast Request on all the network fields to restrict transmission.

A Next Network process 312 provides that if there is no security problem, the Broadcast Message Request is examined to see which is the first network to be attempted. The Admission Parameters for this network will now be queried from the Administration Data Base or from the account data database 216 and examined. When this is performed for all networks, a copy of the Broadcast Message Request is sent to the distributor 224, which converts the Broadcast Message Request into a signal for sending to the Carrier Broadcast Center 114 at the network management center of a network 112. A communication protocol is used that may be a standard protocol, such as the Cell Alert Protocol (CAP) or an application specific protocol such as a Broadcast Message Submission Protocol (BMSP).

In an All Nets Done process 314, an end of file marker is checked and read to determine whether all required networks have been analyzed. When all networks have been signaled, the Set Admiss_Done Flag process 316 sets the flag to complete or notification is set on the Broadcast Message Request record along with a timestamp indicating completion of the administration process. A copy is transmitted to the Broadcast Agent Access Device 104. Also a Copy To Reporting process 318 or set reporting flag provides that a copy of all Broadcasts and Broadcast Message Requests are written to or stored to the Broadcast Message Request reporting field that is sent to the reporting subsystem for transmission to the Broadcast Agent Administrator and to the Carrier Broadcast Centers or their reporting subsystem. Also a Copy to Logfile process (not shown) can provide that the Broadcast Message Request is stored in the Logfile 214 and deleted from the pending area. At this time, as all networks have been signaled with the intended message, the location message broadcasting method 300 is complete.

If all networks have not been signaled, the process continues to a Next Broadcast Agent Parameter process 322 (labeled as Next Agent Parameter) that provides for retrieving the Next Broadcast Agent parameter from the Administration Data Base and comparing it to the requesting Broadcast Agent. An All Parameters Done process 324 ensures that all parameters have been evaluated and the file processing is near completion. If all parameters are not done in process 324 (e.g., results in a NO), then a Fail? process 326 determines if a parameter in the Broadcast Request does not meet predefined criteria for a Broadcast Message as defined by the PLBS system 100 and/or of the Broadcast Agent Administrator. If the Fail? process 326 is negative, then the method 300 continues to a Pass Report process 328. In the Pass Report process 328, if the parameter is within the predefined criteria, the reporting system appends to the Broadcast Message Request report a short message indicating which parameter has been passed. This provides for trouble shooting and resolving disputes. After this, the method 300 returns at process 320 to the Next Broadcast Agent Parameter process 322.

However, if the Fail? process 326 results in a yes, then the method continues with a Decline? process 330. The Decline? process 330 provides that if the parameter under test does not fall within the predefined criteria, the parameter fails and special handing procedures are applied. Such procedures may enable a system override or an operator override such that the Broadcast Message Request may continue even in light of the parameter within the predefined criteria. Such procedure may include checking the Decline parameter. If the Decline? process 330 results in a NO, then a Warning Report process 332 (if the Decline Parameter is not met), generates a warning message and appends it to the Broadcast Message Request. Next a Warning Flag process 334 sets a warning flag against the particular network. The method 300 then loops back to the Next Broadcast Agent Parameter process 322. However, if the Decline? process 330 results in a yes (e.g., if the Decline parameter indicates that the Broadcast Message Request is declined), then a Decline Report process 326 generates and appends a decline report to the Broadcast Request. A Decline Flag process 338 sets a decline flag against that network upon indication of a Decline Parameter. A decline flag may apply to one or more networks as a function of the network facilities or network transmission arrangements/agreements. After the Decline Flag process 338, the method 300 returns to the Next Broadcast Agent Parameter process 322 for further processing.

Referring again to the All Parameters Done process 324, if the All Parameters Done process 324 results in a yes, indicating that all parameters have been processed, a Decline Flag this Network process 340 is initiated. The Decline this Network process 340 provides that when all the parameters have been evaluated, the All Parameters Done message is returned. Prior to sending a Broadcast Message Request to the Distributor 224 for sending to the participating Carrier and Carrier's network 112 or Carrier Broadcast Center (CBC) 114, a determination of whether the Broadcast Message Request or message has been declined by the entity or system is determined. If the Decline Flag this Network process 340 results in a yes, the process returns to the Next Network process 312 so that the next network is evaluated since each network will have network-specific criteria and parameters.

However, if the broadcast message has not been declined for the particular network, then the message is passed on to a Copy to Broadcast Request Distributor 342 process. In process 342 a copy of all or the relevant parts of the Broadcast Request is sent to the Broadcast Distributor 224 or placed in a queue. The Broadcast Distributor 224 may reformat the data according to one or more predefined parameters, formats or protocol associated with the transmission facility or link for communicating to the Carrier or the Carrier Broadcast Center (CBC) 114. Next a Submission Report process 344 provides for a submission date and timestamp to be appended to the report, and stored by the PLBS system 100 and/or Broadcast Agent Access Device 104. The process returns to the Next Network process 312 so that the next network is evaluated since each network will have network-specific criteria and parameters.

Stunning Feature Addition

A Broadcast Agent may feel that the security of his account profile has been breached, for example via an Internet hacker, as he is receiving reports from the Reporting System of activity in his account that the Broadcast Agent did not originate. In such cases, he may temporarily suspend his account from proposing further messages until the security issue is resolved. The Broadcast Agent achieves this by "suspending" (disabling) his account profile by creating a "suspend" broadcast message submission that consists of no message text and no target area (e.g. a null message broadcast proposal). When the broadcast broker receives this message request it analyzes the authenticity of the Broadcast Agent and if validated, marks the Broadcast Agent account in the account data with a "suspend" flag. The reporting system administrator/gatekeeper then reports to the Broadcast Agent, the Broadcast Agent's Administrator and the CEASA Reporting Center that the account was stunned. The Broadcast Agent account can be "unsuspended" only by intervention from the administrator/gatekeeper 218.

If there are further attempts to initiate messages using the Broadcast Agent account after broadcast agent suspension, the Haslemere Admission Control Algorithm 300 would mark it declined on all networks. Admission Control would continue to process the proposal so that a full proposal report can be generated and a message would not be transmitted by the brokers as all of the decline flags would be set and the distributor 224 ignores it. The report is logged but not sent to the reporting center. Instead the reporting subsystem sends copies of the broadcast report to appropriate individuals on the reporting list.

Should the security problem not be resolved, the Broadcast Agent account can be marked as "kill" by the administrator. In such instances, all related administrative data will be deleted from the active side of the data base and archived in the logfile 214.

In practice, a Broadcast Agent using the Broadcast Agent Access Device such as the Broadcast Agent Access Device 104 defines the broadcast target area by drawing shapes or indicating areas on a map to where the broadcast message should be sent. As the broadcast target area will likely be served by two or more carriers or telecommunications service providers, the PLBS system 100 determines which carriers serve all or a portion of the broadcast target area. The PLBS system 100 may perform this function by a Broadcast Distributor 224 which may be an integral system or module or a separate standalone system or module. It may be implemented in hardware or software. The Broadcast Distributor 224 routes the broadcast message to the Carrier Broadcast Center (CBC) 114 of the carriers providing service to all or a part of the broadcast target area as defined in the Broadcast Request. This may be implemented in any possible arrangement including a table, chart, or map.

Operators may in turn have different vendor implementations for a Carrier Broadcast Center (CBC) 114, for example, the GMG 1.5, CellTech, or Logica 1010, so a different mode of signaling for each type may be provided. One known industry standard protocol is Broadcast Message Submission Protocol (BMSP). An alternative standard is the Cell Alert Broadcast (CAP) protocol. Administration data includes routing or address information for the appropriate Carrier Broadcast Center (CBC) 114 interface unit, so that the appropriate signaling protocol conversion occurs.

Signaling to the CBC 114 may utilize an industry standard BMSP or CAP protocol that defines the area polygons in WGS84 coordinates, the message, and associated scheduling information. The CBC 114 provides a check of the proposed broadcast message for validity and converts the defined broadcast target area that may be defined by map polygons into a Cell Identification (CellID) list. In one embodiment, the CBC 114 sends the CellID list to the broadcast switching centers (BSC) 116 by standard communication protocol such as the GSM 03.49 protocol/list. Transmission between PLBS-SB 102 and CBC 114 may utilize commercially available systems and facilities that may include TCP/IP secure tunneling protocols, or X.25 as specified by the local carrier.

When a PLBS Location Selector is provided at the carriers or local carrier's location, the Broadcast Request file may be transmitted by FTP/TCP/IP to the Location Selector for local processing into a Cell ID list before sending to the CBC 114 or the Base Station Controller (BSC) 116.

The Administrative Operator utilizes the PLBS system 100 to designate administrative and operating parameters and profiles, authorizations, and restrictions for each Broadcast Agent Administrator. These may be based on government regulations, negotiated agreements, standards or policies and practices. This may include establishing schedule of authorizations for various Broadcast Agent Administrators and/or Broadcast Agents.

The Administrative Operator also establishes within the system an Administration Database to set account parameters so that Broadcast Agent Administrators and their Broadcast Agents have defined authorization levels. The Administrative Operator also uses the system to establish and maintain an account for each Broadcast Agent and Broadcast Agent Administrator for billing and administration purposes.

The system is configured to enable the Administrative Operator to resolve review Logfiles 214 and Broadcast Requests. The system enables the Administrative Operator to read the logfiles 214, and to read and write to the Administration Data Base. The Administrative Operator Management Subsystem is configured to provide the Administrative Operator with a web control panel or GUI environment in which to administer the User/Broadcast Agent account data and system. The system is configured to generate statistics for administration, management, reporting, and billing.

A Location Broadcast Reporter 110 may be configured to store broadcast messaging data and to prepare and produce reports related to past, pending, and future broadcast messages in one or more areas. The Location Broadcast Reporter 110 may be located at a disaster management office, a control room, or the PLBS-SB 102. However, if the Decline Report 336 process finds that the Decline parameter indicates that the Broadcast Request is declined, access to such reports and data is only made available to authorized personnel of the PLBS operator or an administrative or government entity. Such reports may be made in real-time via a web-based interface such that immediate action may be taken or additional or related actions may be initiated.

When the Admission Control Subsystem 220 does not accept the Proposed Broadcast Message Request, a status message may be sent to the Broadcast Agent Access Device and a Report Required flag may be set. The profile is obtained from the account data to determine the appropriate procedure.

Additionally, a notice or dialogue box may be opened at the Broadcast Agent Access Device to report the situation to the Broadcast Agent. If the Broadcast Agent has logged off the Broadcast Agent Access Device, a notification such as an email report is sent to the Broadcast Agent Administrator and the Broadcast Agent according to predefined addresses and arrangements. A copy of the report is also appended to the Broadcast Request to provide a record of the action.

Reporting also provides for reporting of any activity on the account to the Administrative Operator and Broadcast Agent Administrator. This includes reporting of any warnings that the account may expire. Reporting also sends account information to the Broadcast Agent Administrator on a regular basis depending on parameters defined in the account data. Reports are stored in the logfile which may be accessed by the Broadcast Administrative Operator.

A Broadcast Agent Access Device or Terminal 104 accessing the Broadcast Agent Portal 202 or Webpage 106 may be located at a Disaster Management Office such as a police control room. The authorized Broadcast Agent creates and proposes the message using a web or internet browser, with web access, public service message location broadcasting system Direct, or the Public Service Location Broadcast Controller (PLBC).

The Broadcast Agent interacts with the PLBS-SB 102 over a web page 106, (via a Web Portal 202) and loading of special client software is usually unnecessary. Almost any computer can use PLBS-SB 102 without any modification.

The Broadcast Agent accesses the Public Service Location Broadcast System (PLBS) 100 via a communication network including the Internet and/or the World Wide Web. The Broadcast Agent device may be any communication device and is preferably one that is configured to access the Internet and/or to host a webpage. This includes a personal computer, laptop computer, mobile phone, and personal administrative device and variations thereof.

The Broadcast Agent device can access a webpage 106 or portal 202 hosted directly or indirectly by the public service message location broadcasting system. Any current or future web, Internet, or similar future services browser or access method may be used by the Broadcast Agent. A standard language, such as in one embodiment a Hyper Text Mark-up Language, HTML, may be utilized using any existing or future hardware and/or software platform. Standard, proprietary, and/or commercially available communications systems and protocols may be utilized to provide the various communications facilities and interconnections.

When added security is desired, commercially available or proprietary effective security protocols and measures such as Secure Socket Layer (SSL) with public key encryption may be employed along with private networking facilities, Virtual Private Network (VPN) facilities, and/or secure tunneling features.

A Broadcast Agent Web Portal 202 is made available throughout a LAN or an Internet to provide each and every Broadcast Agent with the flexibility of accessing the Public Service Message Location Broadcast System (PLBS) 100 via any workstation wherever it may be located, including ones located at a home, remote office, or a portable computer, device or platform. The system may utilize wireless LANs such as the 802.11 technology and mobile Internet systems and networks.

The Broadcast Agent Web Portal 202 is presented as a Web Page 106. The Broadcast Agent Webpage 106 may be displayed in a design configuration or pattern with an appearance of a control room or panel. Additionally, the Broadcast Agent Webpage 106 may include a Geographical Information System (GIS) service portal or webpage.

The Broadcast Agent Web Portal 202 or Webpage 106 may include or be composed of one or more maps with scroll bars and zoom options for easy and quick map viewing. One or more tool bars provide the Broadcast Agent with the ability to select and define a broadcast target area in a map format. While current web browsers do not process Geographical Information System (GIS) data, the map may be a Joint Photographic Expert Group (JPEG) format image or file with conversions for position being performed by the PLBS-SB to aid the browser. However, it is expected that in the future the Broadcast Agent Web Portal 202 or Web Page 106 will directly support GIS map data, displaying such information, and definitional inputs.

Figure 4:
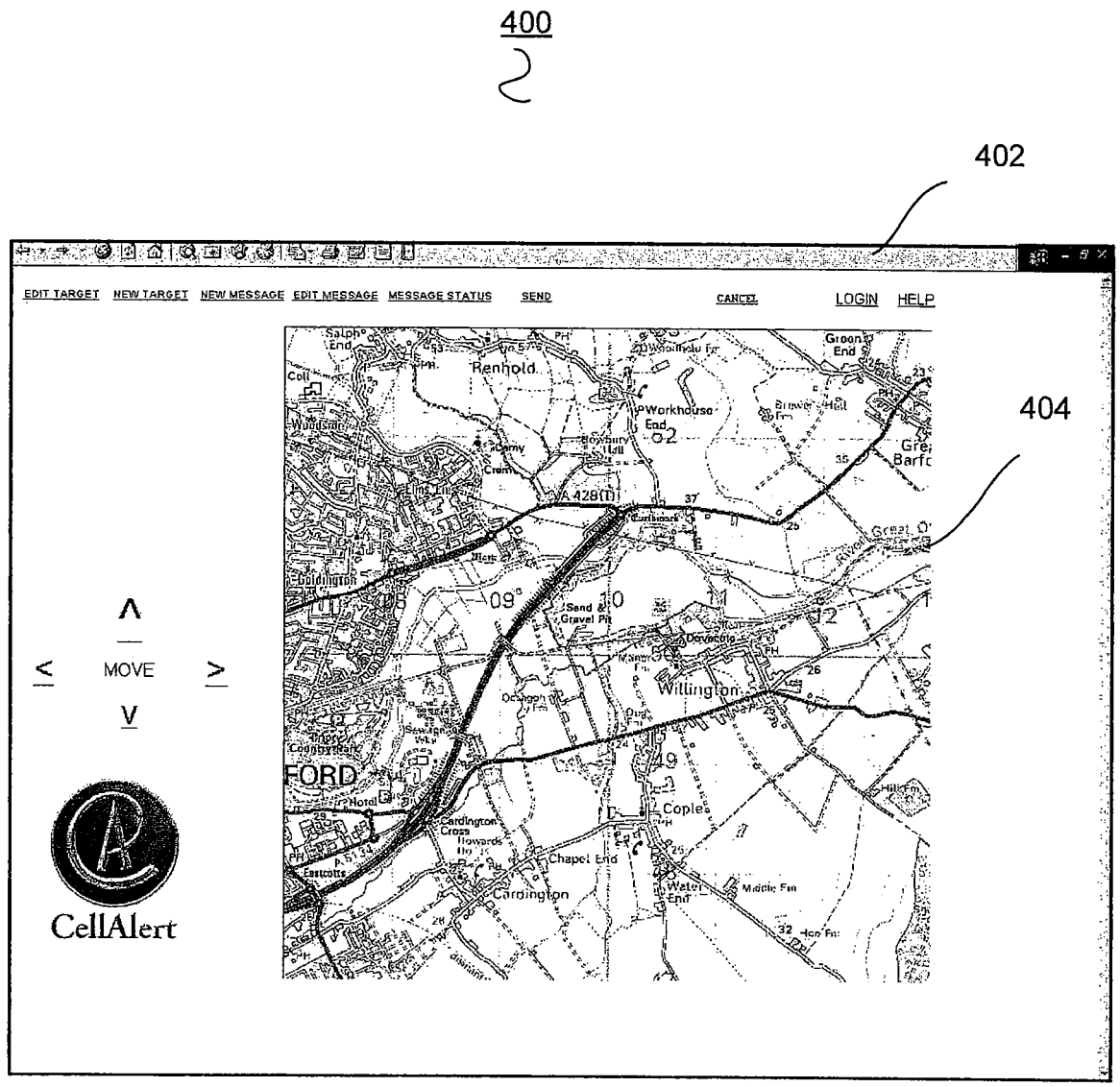
FIG. 4 is a screen shot of the Broadcast Agent Portal Webpage according to one embodiment of the invention.

Referring to FIG. 4, a graphical user interface (GUI) 400, or similar user interface, can be provided by the Web Portal 202, the Web Page 106, local software or similar mechanism, including the Advanced Broadcast Commander 108. The user will have first entered his userID and password before access is allowed. The PLBS system 100 can display a map to the Broadcast Agent as a function of the user ID and his authorized jurisdiction. A Home Page 402 of the Broadcast Agent Web Page 106 may present a map 404 of the demonstration zone and a city or location name associated with the particular geographic area and/or the particular Broadcast Agent. The GUI interface 400 to the Broadcast Agent can be provided by either the Web Portal 202 or the Advanced Broadcast Controller 108. In an alternative embodiment, the Home Page 106 may display general data available to all users.

When a Broadcast Agent logs in to the PLBS system 100, a map 404 of the jurisdiction of that Broadcast Agent is displayed. The map 404 is established by the Administrative Operator and/or the Broadcast Agent Administrator to prevent accidentally sending messages to an unrelated or unauthorized area. As shown, the displayed map 404 includes geographic areas in which the Broadcast Agent can specify or define a target broadcast area. This map can include streets, municipal boundaries, and/or points of interest, by way of example.

The Broadcast Agent Web Portal 202 or Web Page 106 are designed to enable the sending or requesting of a Broadcast Request or message within six "Enters" or "clicks" from the Broadcast Agent accessing the Web Portal 202. Similarly, the system is designed so that such actions are timely and may be accomplished in 15 seconds.

Figure 5:
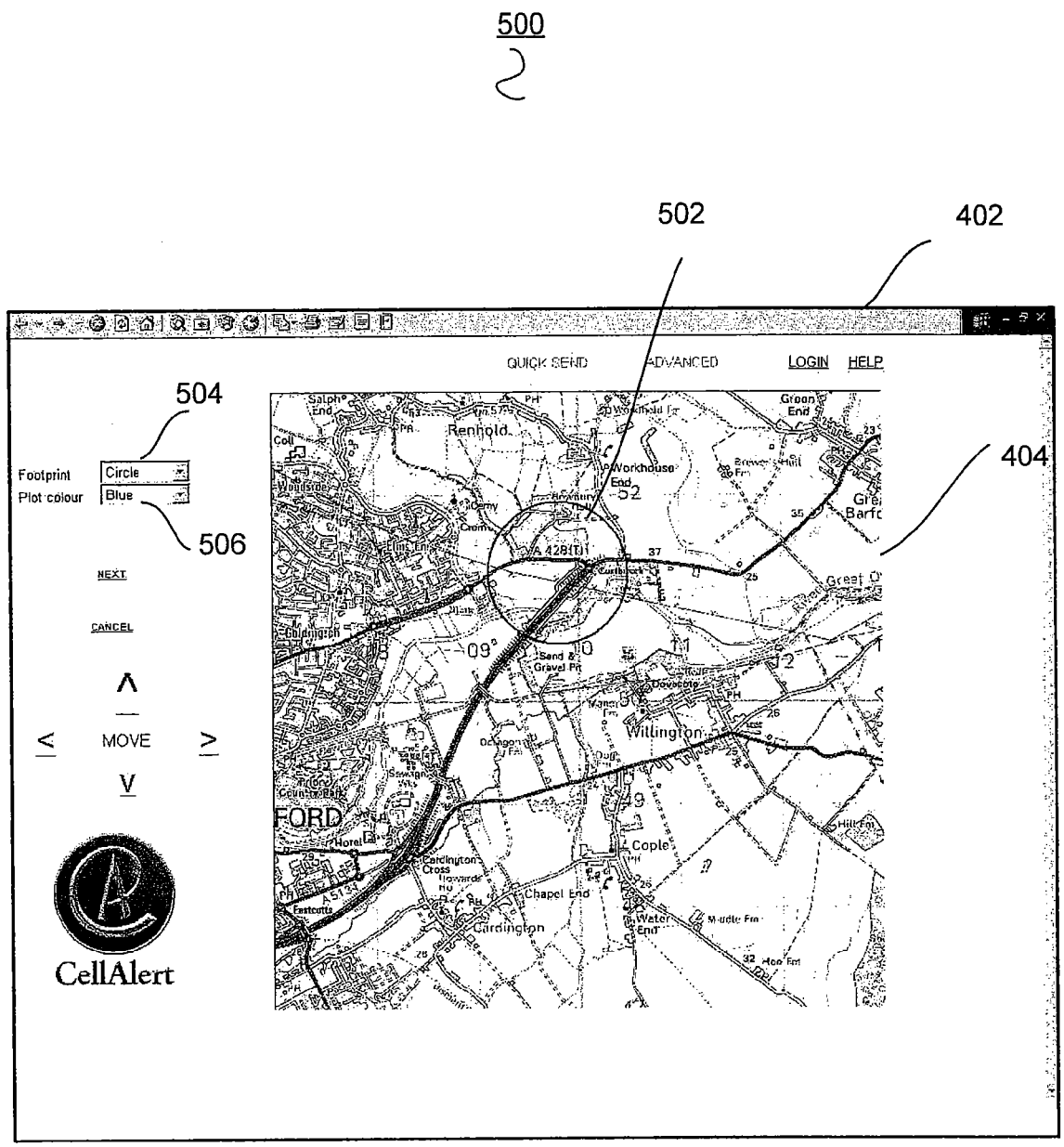
FIG. 5 is a screen shot of the Broadcast Agent Portal Webpage illustrating a Broadcast Agents initial designation of a target broadcast area according to one embodiment of the invention.

Referring to the displayed user interface 500 of FIG. 5, the Broadcast Agent utilizing the Broadcast Agent Web Page 106 uses a pointing device such as a mouse or touchpad to define an area for which the message will be broadcast, e.g., the broadcast target area 502 or Footprint. Preferably, the broadcast target area 502 is defined by the Broadcast Agent through a graphical selection means such as clicking a mouse on the displayed map 404. For example, when displayed the interface 500, the user may use the move buttons to scroll the map 404, and select a scale. He then can use a Draw tool to point and click a mouse to create an area know as the 'Footprint,' such as the target broadcast area 502. In this example, a mapping footprint is selected to be a circle 504 and to be visually indicated by the color blue 506 as selected by the Broadcast Agent.

Figure 6:
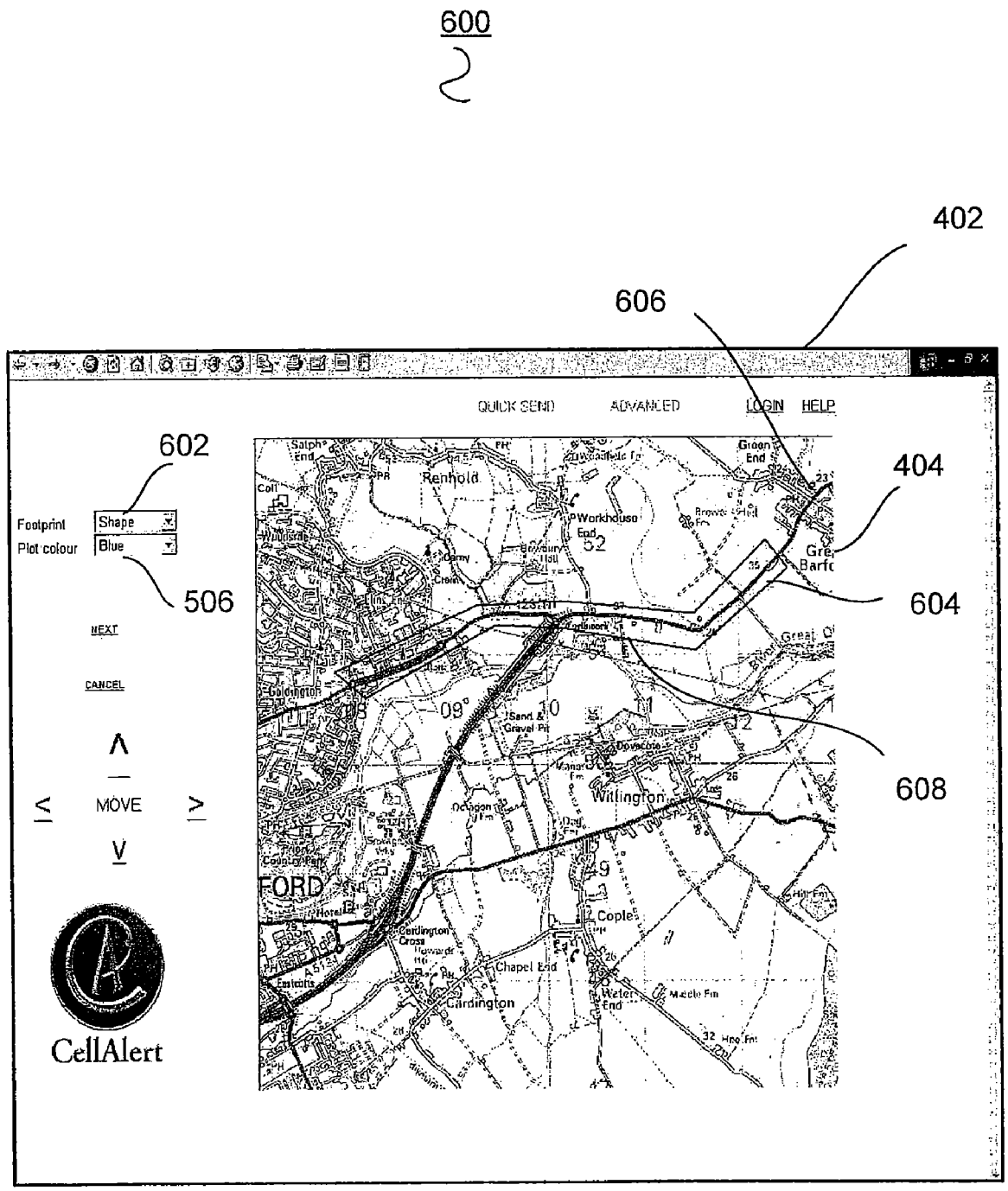
FIG. 6 is a screen shot of the Broadcast Agent Portal Webpage illustrating use of a shape tool to define the designation of a target broadcast area according to one embodiment of the invention.

Additionally, as shown in the displayed user interface 600 in FIG. 6, the Broadcast Agent can utilize the GUI interface and use a shape tool to define the irregular-shaped target broadcast area. In this example, the shape tool 602 selected with the color blue 506 and the Broadcast Agent has defined on map 404 an irregular polygon 604 that surrounds a section of highway 606 that may be the focus of a traffic alert. Such irregular target broadcast area 608 can be defined and saved into a footprint library for later recall.

Figure 7:
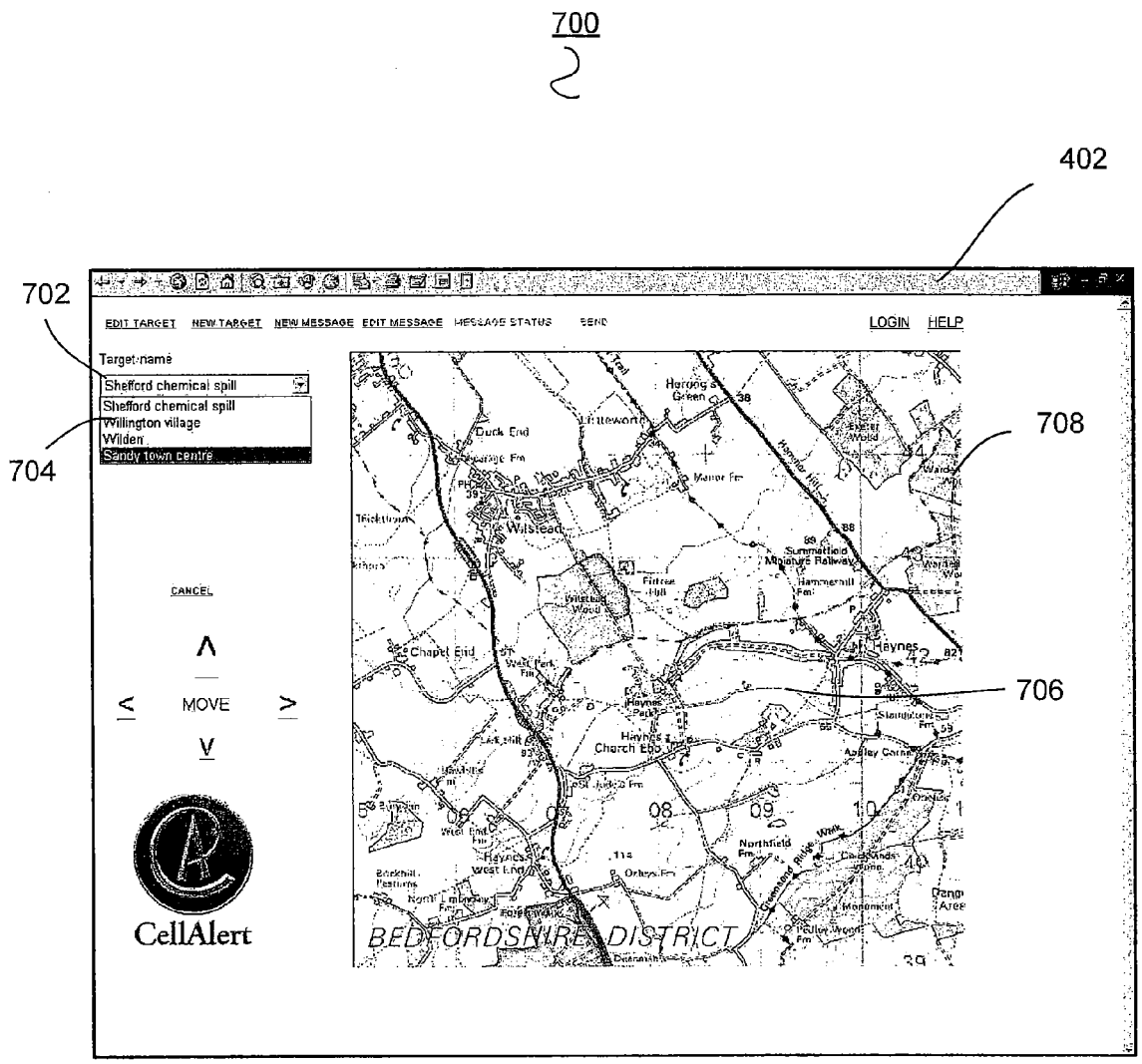
FIG. 7 is a screen shot of the Broadcast Agent Portal Webpage illustrating a library of footprints for predefined target broadcast areas according to one embodiment of the invention.

FIG. 7 illustrates an embodiment of the displayed user interface 700 illustrating selection of a target broadcast area from a library 702 of predefined footprints 704 from which a target broadcast area 706 may be selected on a map 708. One such application may include a library 702 having various flood zone areas 704 that can be selected to broadcast a warning message to recipients in the area in the case of a flood or similar emergency.

Figure 8:
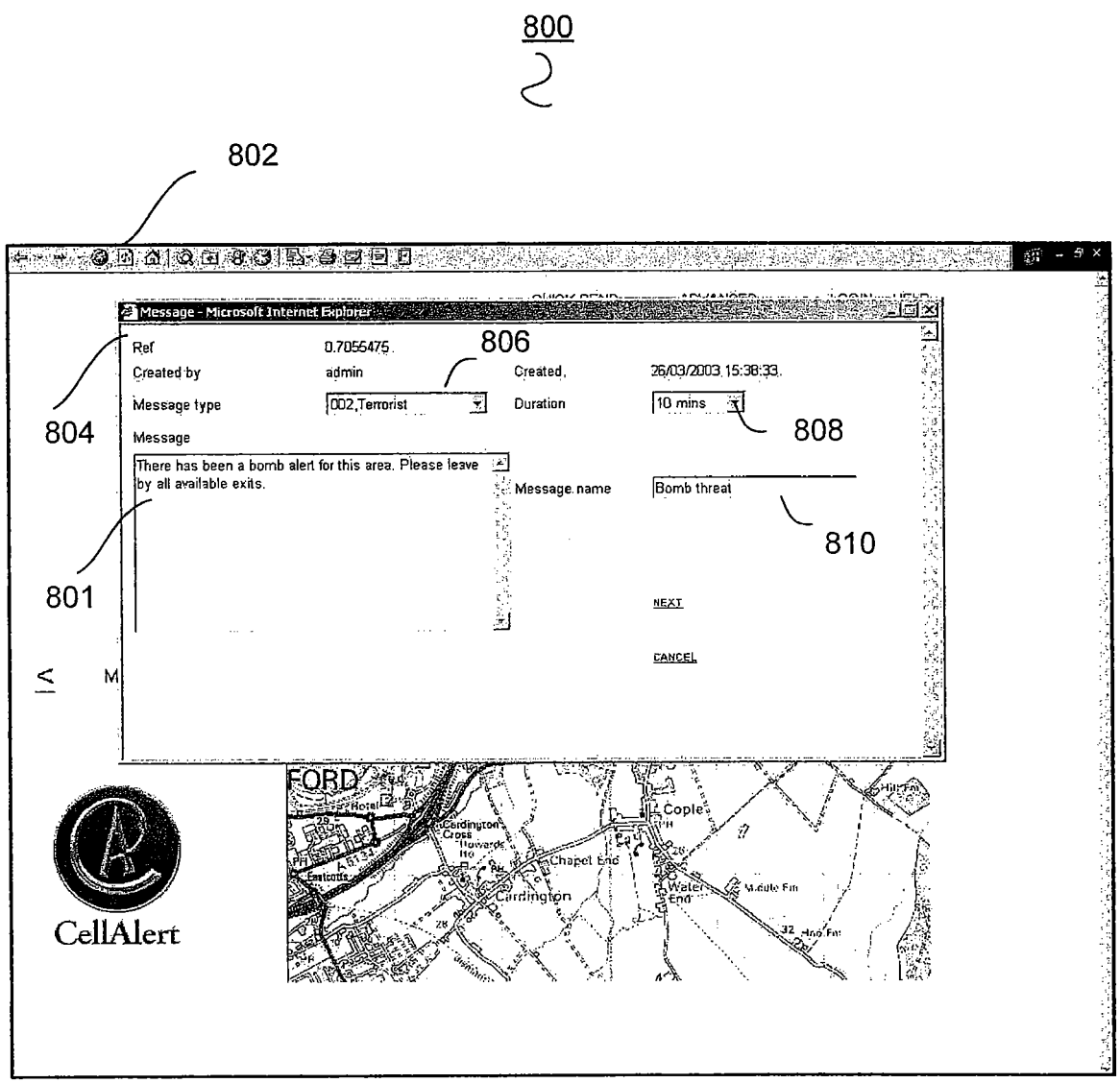
FIG. 8 is a screen shot of the Broadcast Agent Portal Webpage illustrating a dialogue box enabling the Broadcast Agent to create a message and parameters of the Broadcast Request according to one embodiment of the invention.

As shown in the display image 800 of FIG. 8, after the Broadcast Agent defines the broadcast target area, the Broadcast Agent initiates a message menu button on the menu bar 802 and enters a message 801 such as by typing a text message into a keyboard. The message entry display screen or window 804 can allow for the identification of the message type 806, the duration of the broadcast message 808, and an entry of a message name 810. In some embodiments, once the target broadcast area is defined, a dialogue box opens showing options available to the Broadcast Agent. These are typically defined by an administrator, operator, and/or under contract. The Broadcast Agent can then enter the text of the message 801, its channel number (or this may be fixed), and the duration of the broadcast message 808.

Figure 9:
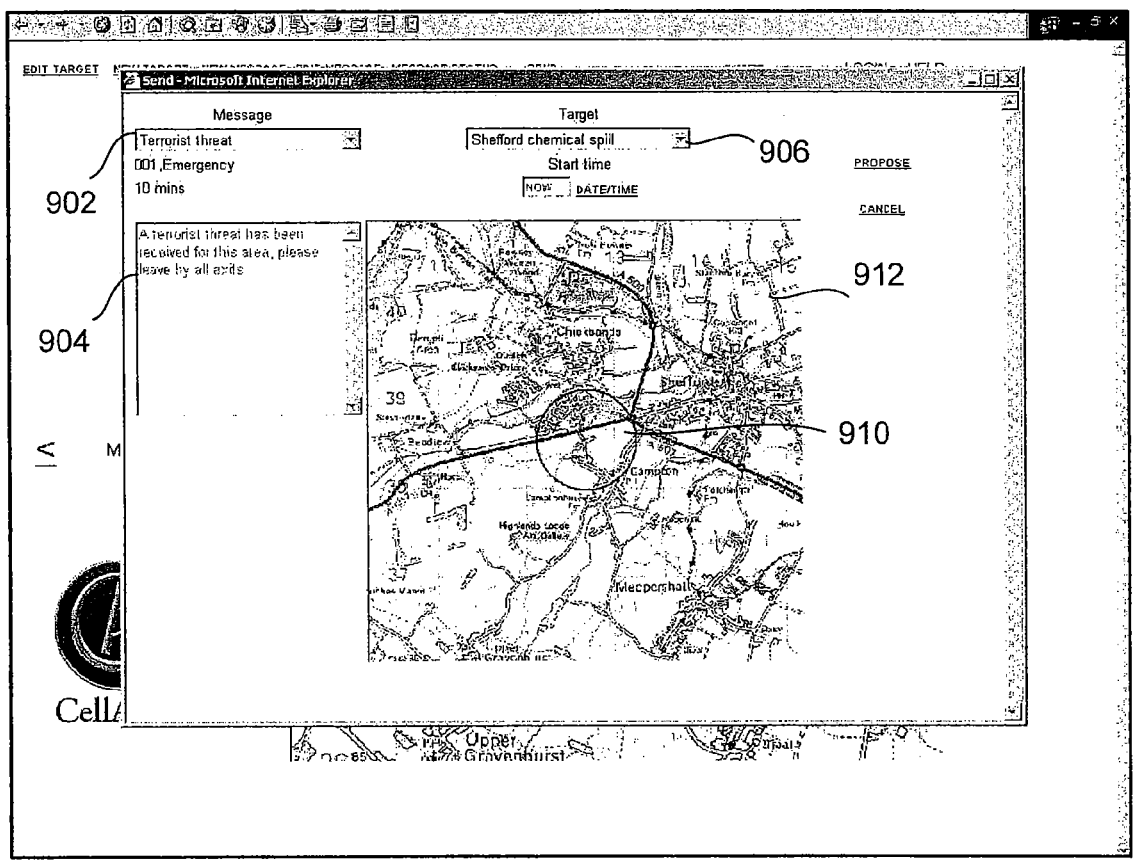
FIG. 9 a screen shot of the Broadcast Agent Portal Webpage illustrating a library of target broadcast areas and a library of messages according to one embodiment of the invention.

In some embodiments as shown in display image 900 of FIG. 9, in some applications a standard library message 902 can be selected from a list of predefined messages, and include the predetermined message 904 and possibly a predetermined target broadcast area 906. Each of these may be recalled in order to expedite the submission of a message broadcast request by a lower authorized Broadcast Agent. As shown in display image 900, the Shefford chemical spill 910 is identified on map 912.

Figure 10:
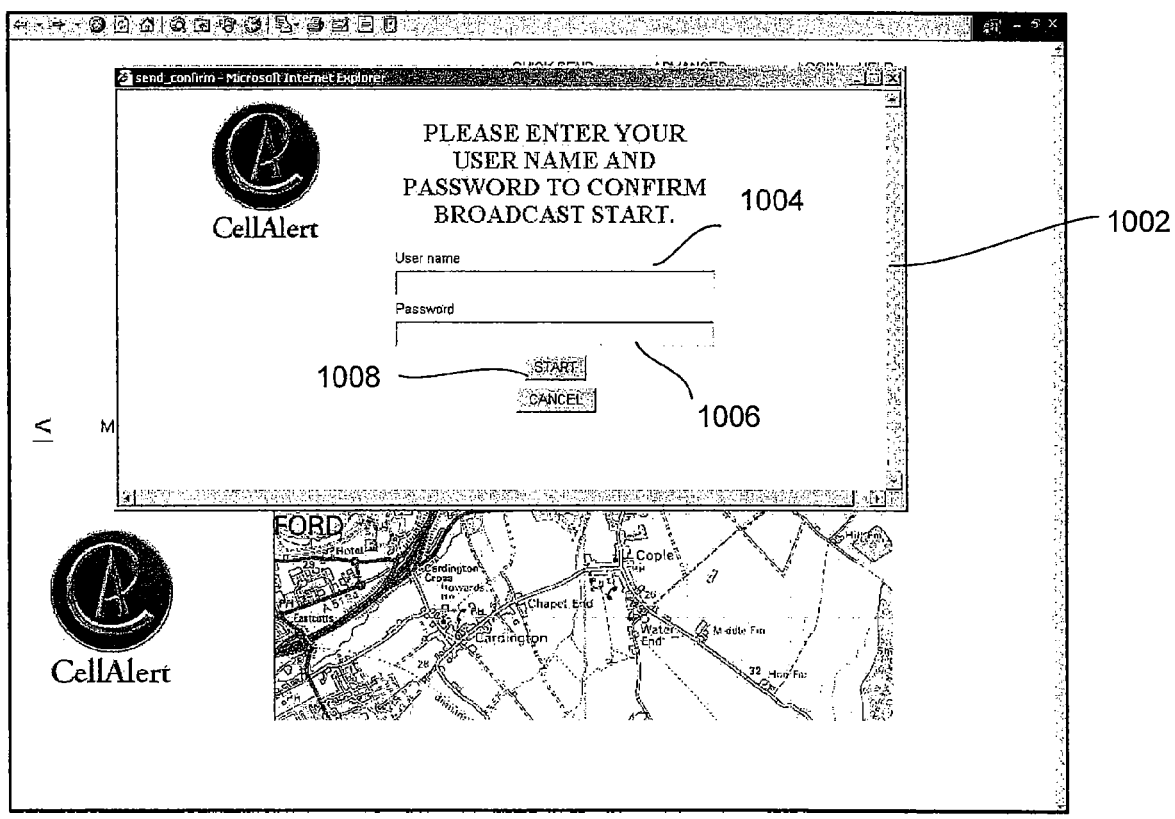
FIG. 10 is a screen shot of the Broadcast Agent Portal Webpage illustrating a Broadcast Agent Confirmation Entry prompt/window according to one embodiment of the invention.

After the Broadcast Agent defines or selects the message to be broadcast and the target broadcast area, the Broadcast Agent authenticates the Broadcast Request through one or more authentication procedures. These may include entering a User ID and Password, speaking a voice authentication message, or otherwise. FIG. 10 illustrates the display image 1000 and authentication window 1002 that enables the Broadcast Agent to enter and confirm his Broadcast Agent's user identification 1004 and authorization password 1006. After the Broadcast Request has been authenticated, the Broadcast Agent initiates the Broadcast Request by pressing a start or go-button 1008 and the Broadcast Request becomes a Broadcast Proposal and is forwarded to the Public Service Location Broadcast System Service Bureau (PLBS-SB) 102 for consideration by Admission Control 220.

Optional system features may also be made available to the Broadcast Agent via the Broadcast Agent Web Portal 202 or Web Page 106. These may be implemented as additional options on an Advanced button or the toolbar. These optional features may include:

Broadcast Target Area/Footprint library
Message library
Multiple language messages
Long messages
Start time, Stop time
Channel codes
Recall messages
Select networks
Progress windows The Broadcast Agent Web Portal 202 and Web Page 106 may provide one or more progress windows.

Once the Broadcast Agent has clicked the go-button 1008, and accepted liability for the message by typing his User ID 1004 and password 1006, the message is not transmitted directly. Instead it is sent to the PLBS-SB's administrations subsystem where the Broadcast Agent is validated for authority for this message. For example, the message has been defined for transmission within his jurisdiction. There may be restrictions on how many messages one individual or center may send in a period. This may be defined by the local carriers, government entities, or by the PLBS-SB 102 operator.

Billing for the service may be based on the area that was defined for the message, or the population density of the broadcast target area for the message. In each case, the Broadcast Agent may want to know what the message is costing before deciding to proceed.

The Broadcast Agent's request and message are validated by the administration subsystem to ensure compliance with all agreements with government authorities and the local carriers. Only in the case of full compliance does the message proceed. If so, a dialogue box confirms when each local carrier has accepted the message.

If not, then the Broadcast Agent will get a dialogue box explaining why the message was declined and a suggestion as to what to do next to get the message sent quickly. For example, a smaller less ambitious Broadcast Target Area/Footprint may be tried, or perhaps authorization from a higher ranking Broadcast Agent.

Alternatively, when a web-based interface cannot handle a particular application or situation, the Advanced Broadcast Controller 108 (ABC) may provide this functionality. This third party application, can call on more, perhaps confidential information to define the broadcast area. In this way, the confidential information never leaves the building.

At the local carrier's office, there is a Carrier Broadcast Center (CBC) 114 server that correlates the cell Latitude and Longitude data received from the PLBS-SB with the locally provided Cell ID data for that carrier's network. A cell serving area map or table is derived from a local carrier's planning tool, systems, and data. Typically, a carrier's engineering group prepares similar information for planning, maintenance and administration purposes.

Location broadcast messages are broadcast by Cellular Network Operators on a per-cell basis over a location broadcast channel. In order to send a location broadcast message, a signal is sent to the Carrier Broadcast Center 114A and 114B. From there, the message is transmitted to the Base Station Controllers (BSC), containing the message to be transmitted, and crucially, the Global Cell IDs of the cells in which the broadcast is to be made, along with some other data such as how often and when the message is to be broadcast.

Cellular operators guard the information about their cells (the cell data) with great care, as the information can be useful to a competitor. They may find the prospect of having this information on multiple unsecured servers to be unacceptable.

According to one embodiment of the PLBS, each carrier maintains and controls access to their own proprietary network data including cell locations and cell serving areas, see FIG. 2. Each carrier receives geographic data defining the target area for the public service broadcast message and determines which transmission links and their associated transmitting locations relate to the target area. Once established, each carrier initiates message broadcasting to only those locations or areas which relate in whole or in part to the broadcast target area. As such, competing carriers do not have access to other carrier's networks or their proprietary network or customer data.

Transmission between PLBS-SB 102 and CBC 114 is achieved with available telecommunication facilities and protocols which may include TCP/IP secure tunneling protocols, security, and authentication. Transmission may be by wireline, wireless, including satellite facilities.

In one embodiment, the PLBS system 100 ensures that the Carrier's cell or network data is retained by the broadcast network carrier in a look up table in the Carrier Broadcast Center 114 at the Local Carrier's office. This includes the Cell Identification Codes of the cells, the Latitude and Longitude positions of their respective Radio Base Station sites and azimuth data for their sectors. Inclusion of cell-sector azimuth data leads to per-cell per-sector resolution, but for the first application per-cell resolution may be good enough considering the small size of modern cells, which are typically 1-3 Km in diameter (about 2 miles). The cell data never leaves the Carrier's Network office. The local carrier such as a mobile service carrier provides the hosting of the cell-broadcast messaging technology, access to the local cell network, and transmission of the cell-broadcast messages to its subscribers. Additionally, the carriers or mobile unit service providers may provide cell-site geographic coverage data either internally or to the PLBS operator to enable the operator GUI interface.

Location broadcast messages may be employed in several ways when numerous operators or carriers in a particular geographical area require the same information in a timely manner. Such information may include text messages relating to emergency situations, and, for 3G cells and phones, pictures of wanted or missing persons, graphical data, maps of problem areas including areas to avoid and escape routes.

Location broadcasting is a function of cellular networks and is defined by the official standardization bodies, such as GSM MoU, (GSM 03.41) UMTS, 3GPP/3GPP2 and IS95 CDMA. Many networks have location broadcast channels defined for their networks which are unused at present for lack of a suitable application.

There is typically more than one carrier or operator providing service in the same area. There is no coordination of cell planning between competing operators, and as such, the Cell layouts and Cell IDs are unique to each carrier. In addition, due to continuous innovation in telecommunication technologies, cell coverage and network capacity, the network design, and size and layout of geographic network systems and cells covering a particular area can be dynamic, e.g., network reconfigurations, cell splits and switch cutovers.

Also, many networks 112 have a hierarchical network or cell structure system, with overlapping patterns of networks or cells of different sizes, such as Umbrella Cells, Macro Cells, Overlaid cells, Micro Cells and Pico cells. They may also have multiple layers of sub-band structure in different frequency bands such as (850-1900 or 900-1800-2 Ghz, with each having unique Cell IDs and different base station spacing.

Multi-network configurations will continue to increase in complexity with the introduction of 3G General Packet Radio Service (GPRS), EDGE, CDMA2000, UMTS and TD-SCDMA. 3G location broadcast messages will be much more capable, so different Cell ID tables are entered for a plain text version of the broadcast message than for a multimedia version.

A single message transmission of about 1 KB may be used by the Carrier for each transmission area or cell. The base station controller transceiver then carries out the repetition of the message for the time required.

User receiving devices may include mobile or cellular phones, PDA's, PC's, etc. Receiving devices may provide a distinct alert ring-tone that continues until the message is acknowledged by a local user. Such features and functions are dependent on the features and functionality of the various receiving devices. Some receiving devices may be configured to receive text messages, graphical data, images, and maps or may be capable of connecting to a designated website that provides additional information.

With one or more embodiments of the current system, special handsets or mobile unit units are not required. Global System for Mobile Communication (GSM) handsets may display a public service message location broadcasting system message as provided by a supporting GSM mobile service provider. Additionally, 3rd Generation mobile unit services providers and mobile unit or cellular devices will display location broadcast messages consistent with the public service message location broadcasting PLBS system 100.

A public service message location broadcasting service may also display a public service message location broadcasting system provider insignia or service mark.

Because the public service message location broadcasting system is independent of the mobile carrier's voice and SMS channels, cell-broadcasting will continue to operate during emergencies that result in high calling volume thereby enabling local authorities with a viable communications link for emergency instructions despite interruptions in voice and SMS service.

In operation, the PLBS system 100 may be provided, in one embodiment, by a method described herein. In the event of a need for a public service message broadcast, an authorized Broadcast Agent enters a password to access the public service message location broadcasting system via a Broadcast Agent System accessing a Broadcast Agent Web Portal from an attached Internet-enabled device. The system recognizes the Broadcast Agent and displays a map or illustration of his jurisdiction.

The Broadcast Agent defines or selects the broadcast target area which may be the entire authorized Broadcast Jurisdiction or may be a portion thereof. The Broadcast Agent constructs a text message indicating the nature of the emergency and/or required action. The Broadcast Agent specifies the length of time the message is to be broadcast and/or received by the receiving devices in the target area. The Broadcast Agent utilizing the Broadcast Agent System confirms and sends the data to the public service message location broadcasting system server.

The public service message location broadcasting system's Broadcast Data Management (BDM) server reformats the data and forwards it to the Carrier Broadcast Center 114 for each of the telecommunication carriers providing service within the broadcast target area.

Each participating Carrier Broadcast Center (CBC) 114 selects one or more sub-networks and/or cell-sectors (such as transmission towers) that serve all or a portion of the target area so that the entire broadcast target area is covered by a broadcast. The CBC 114 broadcasts the message to all receiving devices within its serving area. The CBC 114 broadcast transmission process is repeated for the duration of the alert to accommodate additional devices entering, becoming available, or being activated/powering-on within the target area. Receiving devices located within the broadcast sub-networks or cells receive the public service broadcast message, and may provide an alert and display of the message.

In practice, operation of one or more embodiments may be described by the following example.

It is late at night and a river level is rising to dangerous levels. The local police want to warn the population at risk, the people who live in the area likely to flood. However, since it is night time, they are not watching their televisions or listening to the radio. The senior police officer, or disaster manager, in the position of a Broadcast Agent accesses the public service message location broadcasting system web page 106 that is located at a central site. The officer selects a map of the area that is in danger of flooding. The officer defines or selects a geographic broadcast target area to be notified of the danger. The officer enters a message indicating the nature of the danger and suggested actions such as FLOOD WARNING in your area. The officer initiates the broadcast messaging by following a security procedure and clicks a go-button 1008.

The PLBS-SB 102 receives the messages, performs a check on the validity of the officer as a Broadcast Agent that is proposing the message for the particular notification or target broadcast area. Once validated, the PLBS-SB 102 sends messages to each of the telecommunication service providers or carriers having networks 112, coverage, or receiving units within the defined coverage area.

Each local telecommunication service provider receives the message and target broadcast area definitions from the broadcast system and initiates transmission of the broadcast message to the particular carrier's transmission networks 112 serving the defined target broadcast area. The local network 112 of the telecommunication service provider broadcasts the message to every active compatible receiving unit active within the defined notification area. Each receiving unit receives the broadcast message and displays the message and may provide a common or unique alerting signal.

Reporting Subsystem Insert

Figure 11:
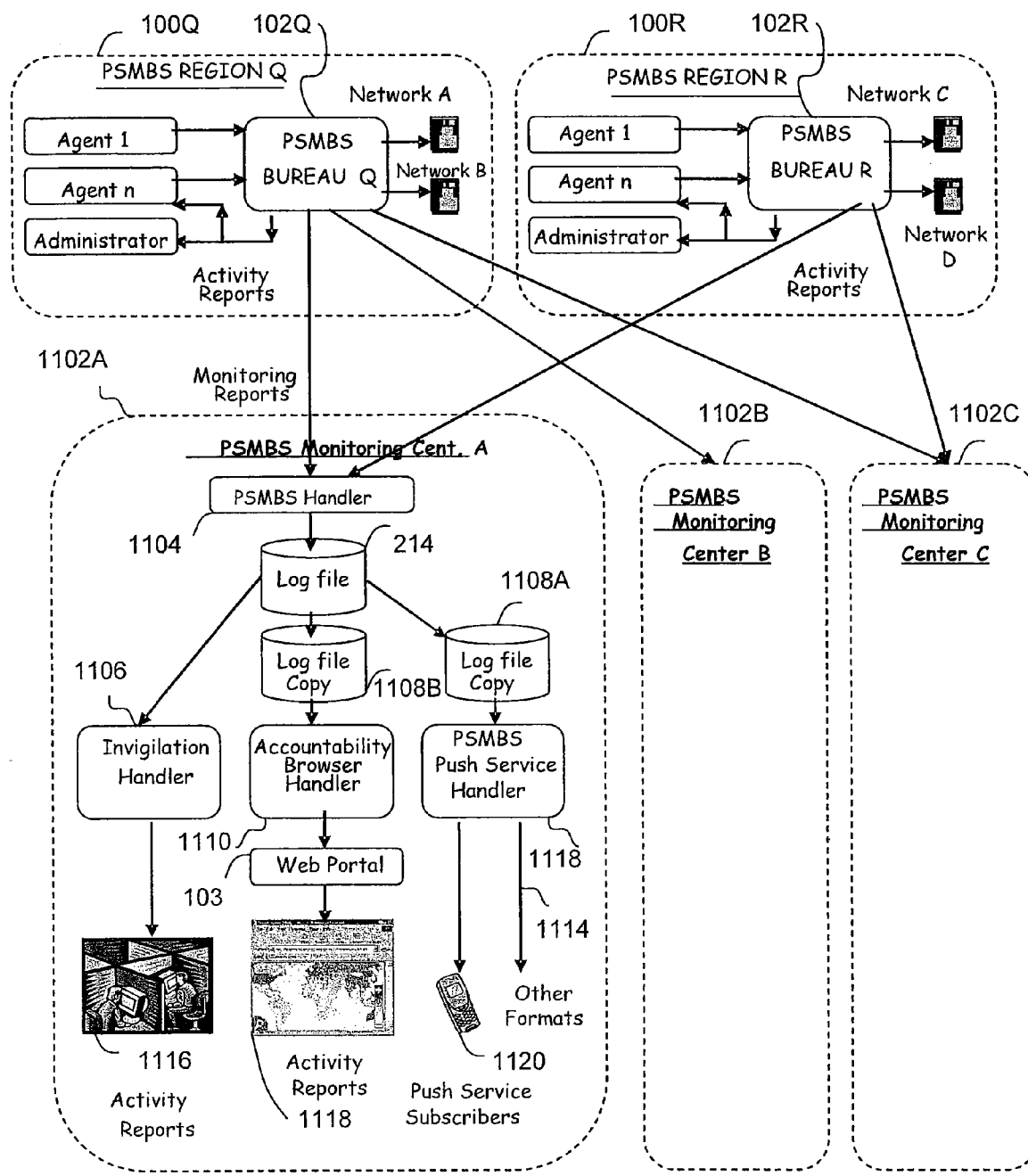
FIG. 11 is a functional block diagram of the reporting system of a public service message location broadcast system according to one embodiment.

FIG. 11 illustrates a functional block diagram embodiment of the PSMBS Reporting Subsystem. In this embodiment, two regional PSMBS systems, 100Q and 100R, provide broadcast messaging services to multiple networks within each region and store the broadcast records in the account data of each system. Three separate PSMBS Monitoring Centers, 1102A, 1102B and 1102C, seek to retrieve broadcast message records from the two regions.

Monitoring Centers A and C retrieve broadcast records from regions 100Q and 100R, and Monitoring Center B retrieves broadcast records only from region 100Q. The functional details for retrieving broadcast message records are provided for Monitoring Center 1102A. A PSMBS Handler 1104 interfaces to both regional PSMBS Bureaus. The retrieved broadcast message records are written to a Log file 214 that is maintained as an unchangeable data file to preserve the information from potential hacking by other reporting applications. Data stored in Log file 214 is mirror copied to Log files 1108A and 1108B for access by other applications. In this embodiment third parties can access the data through an Accountability Browser Handler 1110 that serves as a web portal to produce predefined web-based activity reports 1118. Another exemplary embodiment of third party access to broadcast message information is shown for push service subscribers 1120 that access predefined report information through a PSMBS Push Service Handler 1118. Other push service formats 1114 may be supported by the Push Service Handler 1118 for receiving devices that require device-specific data formatting. Only the invigilator 1116 at Monitoring Center A 1192A can access activity reports through the Invigilator Handler 1106 process the records in Log file 214.

An operator of a Public Service Message Broadcasting System (PSMBS) can offer broadcast messaging services to both government organizations and non-government organizations (NGOs). For example, an NGO may be a commercial customer seeking to promote products and/or information services to a specific market segment via "push" broadcast messaging. Alternatively, a retail customer may subscribe to a subscription service channel that broadcasts messages to the subscriber related to a special interest information service, such as monitoring stock prices via a personal digital assistance (PDA) device capable of receiving a wireless broadcast message over a user-selectable messaging channel.

In one embodiment, these messaging services are provisioned over the infrastructure at the Cell Broadcast Broker location, the PSMBS, and the broadcast message distribution infrastructure of the network operator that has contracted with the PSMBS Operator to distribute such messages within their network. Contracting networks may include cellular networks, paging networks, cable television networks, information service provider (ISP) networks or any network capable of broadcasting messages to a targeted area or group.

A PSMBS operator bills its customers for their broadcast messaging services and compensates the contracting distribution networks for the use of their networks to distribute those broadcast messages. To be successful, the PSMBS business model must provide compensatory revenues to contracting networks for the incremental usage of their network facilities (i.e., an operating expense for the PSMBS operator) and profitable service revenues to the PSMBS service provider.

The billing system (and associated methods) disclosed herein is capable of calculating compensatory network usage fees paid to network operators, PSMBS service fees to PSMBS customers, including subscription service billing fees to push-service subscribers. An exemplary embodiment disclosed herein illustrates the billing system features and capabilities inherent to providing broadcast messaging services over cellular broadcast message distribution networks, but is not limited to cellular networks.

In a GSM system, the Mobile Network Operator commands each network cell to be configured with a cell broadcast channel or alternatively, may command cells within the network not to configure a broadcast channel for broadcast message distribution within the cell's coverage area/service footprint. The command to enable message broadcasting requires taking one sub-channel of a Stand Alone Dedicated Control Channel (SDCCH) out of service for standard control channel usage (e.g., Mobile Set (MS) call set-up, call termination, short-messaging-service set-up, normal MS location updating, etc.). SDCCH sub-channels can be used to carry control, SMS and Wireless Applications Protocol (WAP) traffic. In most cell configurations there are 8 SDCCH channels in one air interface timeslot, though there may be 16 or more to support dense cellular traffic. The billing system calculates fees to compensate the network operator for the broadcast message usage of a SDCCH sub-channel.

As known in the art, the Ericsson BAS1 traffic model is based upon average cell traffic statistics. The table below illustrates average SDCCH sub-channel offered control traffic (in milli-Erlangs/subscriber, i.e., mE/Sub) to the control channel group for various events according to the BAS1 traffic model.

| BAS1 Event | Inner Cell mE/Sub | Border Cell mE/Sub | Average mE/Sub |
| --- | --- | --- | --- |
| Location update | 0 | 1.5 | 0.5 |
| IMSI attach/detach | 0.4 | 0.4 | 0.4 |
| Periodic registration | 0.2 | 0.2 | 0.2 |
| Call set-up | 0.8 | 0.8 | 0.8 |
| SMS p-p | 0.3 | 0.3 | 0.3 |
| Total | 1.7 | 3.2 | 2.2 |

The amount of traffic on the control channel of any cell also depends on whether it is an Inner Cell, i.e., one not on a location area border, or an Outer Cell—one which is on a location area border. When a mobile set crosses a location area border it communicates to the serving switching system to effect a hand-off so it can be paged by the control channel of the switch serving the area within which the MS is now located. The mobile set is identified by its unique International Mobile Subscriber Identification (IMSI) code.

In one embodiment of the control channel usage model, a single traffic channel is serving the control function activities for a typical cell site. The average offered traffic per subscriber of 0.0022 Erlang equates to 0.264 minutes of airtime per subscriber per day or 96.36 minutes per sub per year. Since there are eight (8) sub-channels per traffic control channel, the offered load per sub-channel is 12.045 minutes of traffic per subscriber per year. Thus, the network operator may be compensated for 12 minutes of broadcast message traffic per subscriber per year for full time access to the dedicated sub-channel by the PSMBS system. Alternatively, the network operator can be compensated on a network-usage basis.

The number of network operator subscribers within a network-specific target area, which may be the entire area of the broadcast message target area or a portion thereof, can be calculated as a product of the message target area served by the network operator times the average subscriber density (e.g., subscribers/square kilometer) for the network operator. A billing unit to the message initiator is constructed that considers the length of the message, the number of repeat broadcasts of the message within the network-specific target area and the number of network-specific subscribers accessible by the broadcast message during a billing period. This billing unit is applied to each network delivering the broadcast message. The billing period may be monthly, quarterly, semi-annually or annually, for example.

One exemplary billing unit is that of a network broadcast fee per message "shot", wherein a "shot" is defined as the product of 15 message pages×10,000 subscribers. The fee/shot rate is applied to the number of network-specific subscribers within a network's message target area divided by 10,000. This fee is applied to each individual broadcast message record from a Broadcast Agent that is authenticated for each broadcast message distribution network. In this exemplary embodiment, the total billing charge is usage sensitive for each billing period. Alternatively, an average billing period fixed charge can be constructed that considers an average broadcast message usage for the billing period.

Compensation to the network operator contracted to broadcast PSMBS messages can similarly be constructed on the basis of the "shot" unit or a similar unit. The network fee paid to the network operator per billing period may also be based on the "shots" distributed by the network operator for the billing period. Alternatively, a fixed network fee may be constructed for a given service period based on average broadcast message statistics. While the exemplary billing unit of a "fee per shot" is illustrated, other billing units can be constructed that are appropriate for a given broadcast message initiator and a billing unit of the billing system is not limited to the "shot" unit.

Figure 12:
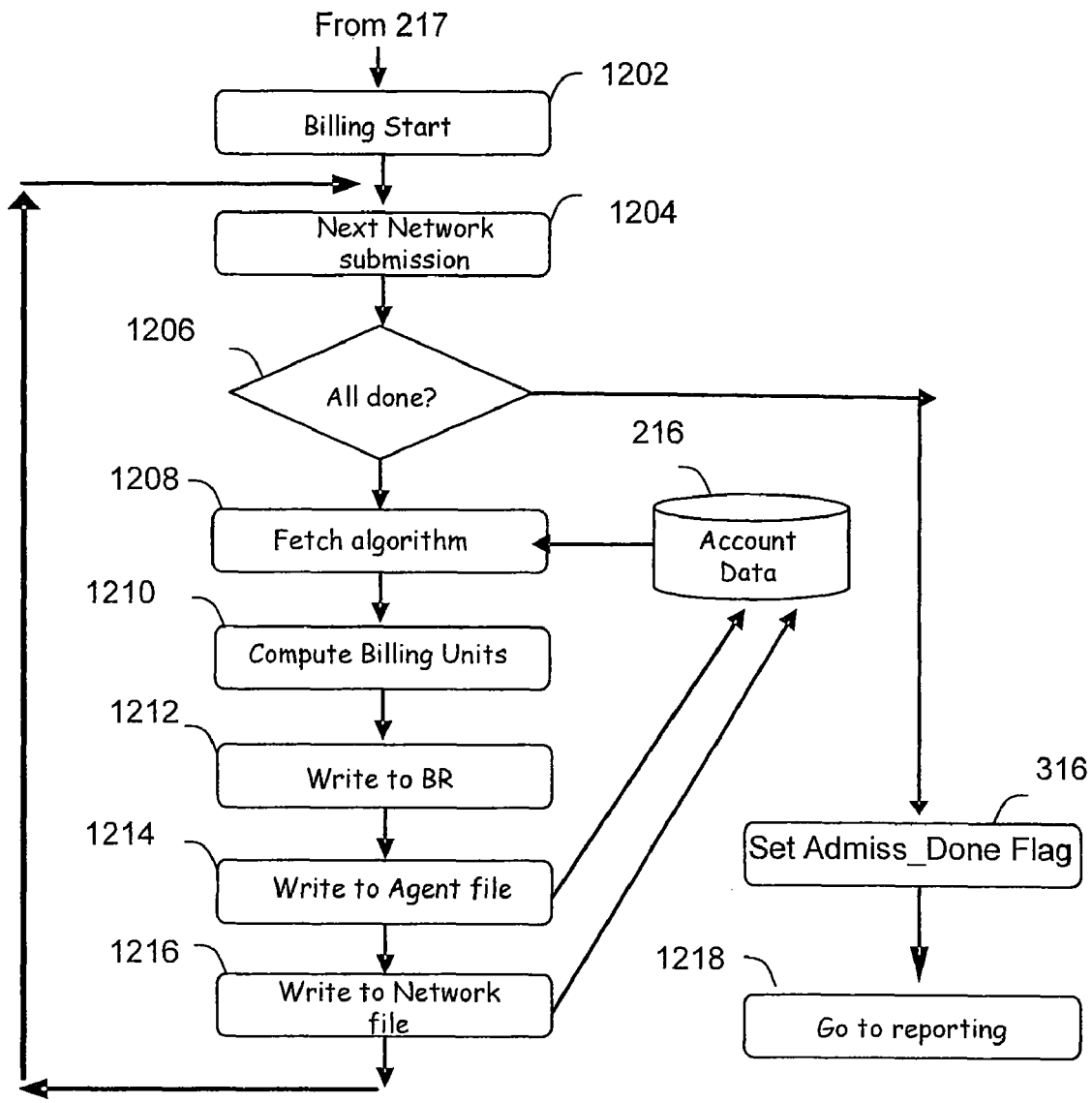
FIG. 12 is a flow chart for a billing system according to one embodiment.

FIG. 12 is an exemplary embodiment of a billing system flow diagram for a broadcast message that has successfully sequenced through a network submission authorization of the Haslemere Admission Control Algorithm. The billing process for the authorized network begins with the Fetch algorithm 1208 accessing the network billing algorithm used for the network. Billing units are computed in step 1210, such as the exemplary "shot" unit. The calculated bill for the authorized network for the broadcast request is appended to the broadcast request in step 1212, written to the agent file in step 1214 and written to the network file in step 1216, both files being stored in the account data 216. The next authorized network is accessed in step 1204. If all authorized networks have been processed as tested in the All done? step 1206, the Admiss_Done Flag is set in step 316 and the completed record submitted to the Reporting Subsystem in step 1218.

Another billing embodiment of the system provides for the billing of auxiliary "push services" to push service subscribers. Such billing is typically on a flat rate basis to subscribers that access such services over unique push service channel codes. An exemplary "push service" may include the reception of sports score results or weather information.

Another billing embodiment provides for the billing of commercial customers that are sponsors of push information content services (at no charge to the message recipient) such as sales promotions from a retailer, In such applications, the sponsor is billed for the broadcast messages which are broadcast over a unique sponsor-assigned broadcast channel. Individual commercial billing contracts are established for such applications.

Figure 13:
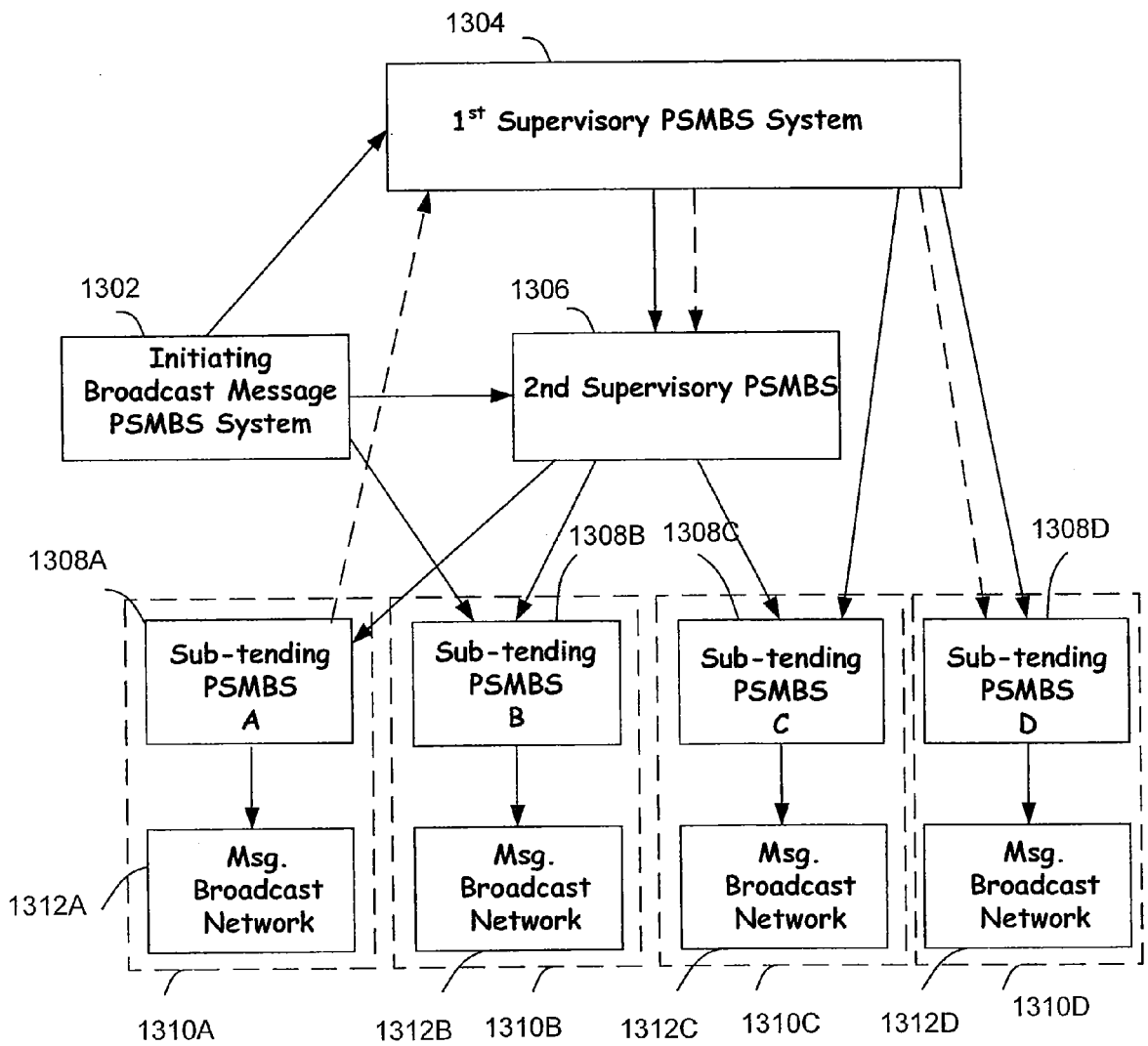
FIG. 13 is a functional block diagram of a geo-fence process for a broadcast message in one embodiment.

FIG. 13 illustrates an embodiment of a Geo-fenced Broadcast Message Routing System (GBMRS). This embodiment addresses a broadcast message environment in which a broadcast message is initiated by PSMBS System 1302 that seeks to broadcast the message to regions out of its direct jurisdiction. In this embodiment PSMBS 1302 has no authority to transmit the broadcast message to target areas 1310A-D served by Message Broadcast Networks 1312A-D. To achieve the transmission of the broadcast message to these target areas requires PSMBS 1302 to send the message to a supervisory PSMBS system for additional processing. The first supervisory PSMBS System 1304 has jurisdictional access to all the target areas either directly to area 1310D via the sub-tending PSMBS 1308D and indirectly to areas 1310A-C through the second supervisory PSMBS 1306 and its sub-tending PSMBSs 1308A, 1308B and 1308C. Each of the lower level PSMBS systems is responsible for transmitting the broadcast message to the associated transmission network within their broadcast coverage area.

At each step of forwarding the broadcast message to the appropriate PSMBS system, the Admission Control process takes place as if it were a new broadcast message request—re-authorization is required at each PSMBS system and broadcast records are kept at each system.

In one exemplary embodiment the first supervisory PSMBS system may be a global system, the second supervisory system a national system and sub-tending systems may be state or provincial broadcast messaging system.

In another embodiment the first supervisory system may be a national system, the second supervisory system a state system and the sub-tending system may be limited to a metropolitan area. The described geo-fencing embodiments are not intended to limit the scope of geo-fencing but provided in conceptual format in FIG. 13.

Figure 14:
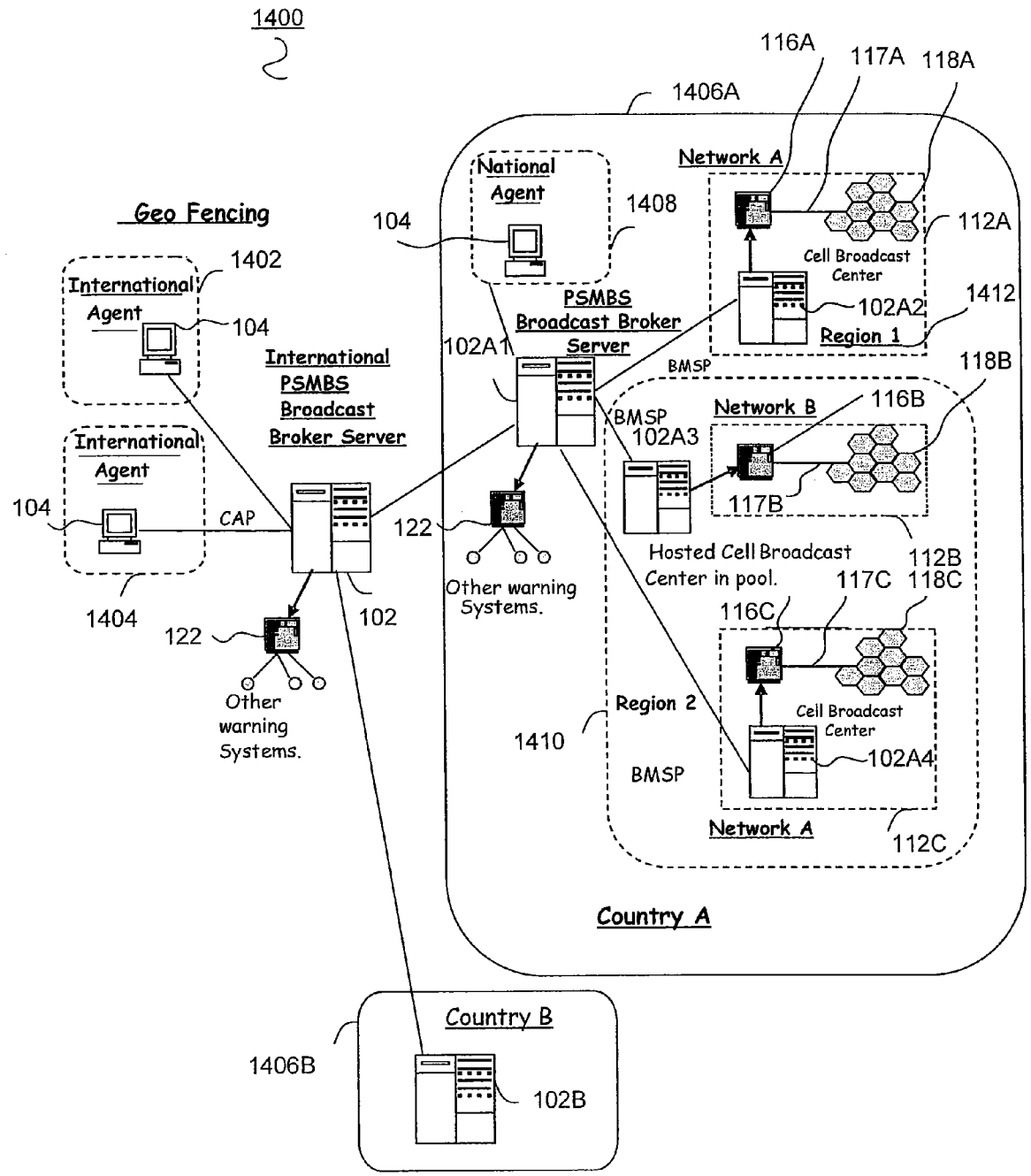
FIG. 14 is a second functional block diagram of an exemplary geo-fence process in another embodiment.

FIG. 14 provides another exemplary embodiment of a PSMBS geo-fencing application and may best be illustrated within the context of a Tsunami broadcast message requiring international broadcast message coordination. International agents 1402 or 1404 receive a Tsunami report and desire to broadcast the warning message to Country A 1406A and Country B 1406B. The International Bureau 102 receives the broadcast message request from the international agent and performs the same admission control as for any other message submission to verify its authenticity. The message is checked against an administration data base to verify which countries accept messages from the message source. A geo code or polygon defines the scope of the target area for the broadcast message. Once admission control validates the target area parameters, the distributor checks the geo code against those in its data base. If a PSMBS Bureau service area is within the polygon or defined in the data base, a copy of the message is sent to national bureau.

At the national bureau, the admission control process is repeated so that national sovereignty is respected, as national or regional trust protocol is enforced by the regional admission control algorithm and not the international agreement. In FIG. 14 the national bureau 102A1 copies the message to Region 1 (1412) and Region 2 (1410) for further processing by Cell Broadcast Centers 102A2, 102A3 and 102A4. Within a national or regional bureau system, the polygon or geo code can be validated against the service area of each concerned broadcast network. Once admission control is completed, the distributor subsystem will check the geo code or polygon against those in its data base. If a network service area is under the polygon or defined in the data base, then a copy of the message is sent to each network operations center for transmission. In the jurisdictional geo-fencing embodiment of FIG. 4, the international PSMBS System 102 has jurisdiction to directly transmit the broadcast message to Country B (1406B) and no requirement to coordinate through a country bureau.

Figure 15:
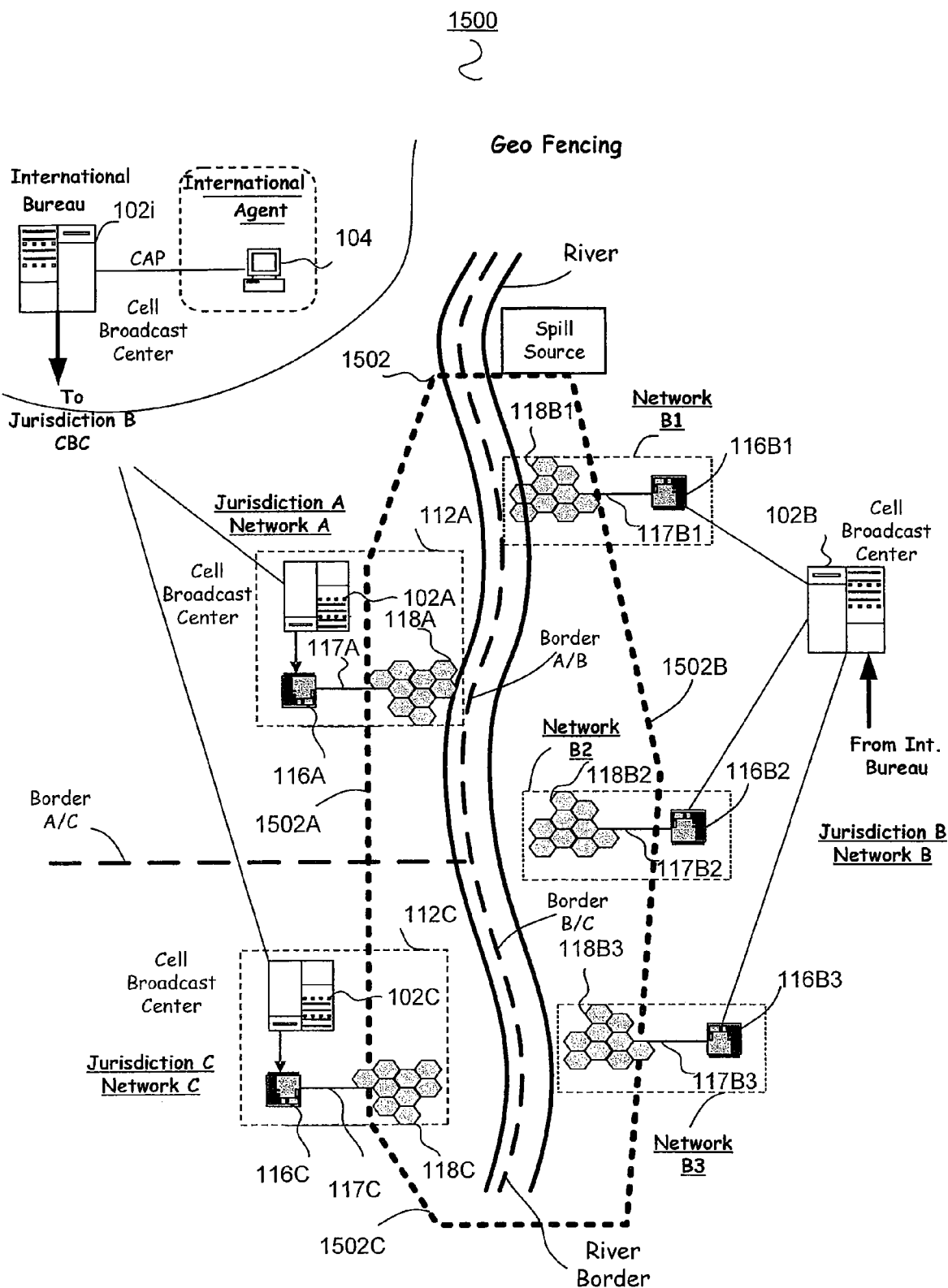
FIG. 15 is a third functional block diagram of a geo-fence process in another exemplary embodiment.

In another embodiment of broadcast message jurisdictional geo-fencing, as shown in FIG. 15, an international PSMBS bureau receives a broadcast message from entity B serving jurisdiction B that has broadcast message authority only for its jurisdiction, advising that a hazardous spill into the river has occurred north of the defined broadcast message target area. The message request includes broadcast target area 1502 that includes jurisdictions A and C for which jurisdiction B has no authority. The warning message can be broadcast by jurisdiction B over the cell sites 118 B1-B3 in networks B1, B2 and B3 along the east side of river defined the portion of polygon 1502 boundary that includes the east river border (illustrated as the middle of the river) and bounded by the polygon area that resides within jurisdiction B.

Upon receipt of the broadcast message request from jurisdiction B at the international bureau 102*i*, the broadcast message request is authenticated by the admission control algorithm and, if validated, forwarded with to jurisdictions A and C with either the full broadcast area definition or with revised polygon broadcast target areas that are defined as polygon 1502A and 1502C. Each jurisdictional PSMBS system processes the broadcast request with its admission control algorithm and when validated transmits the warning message to authorized broadcast message transmission networks.

In this exemplary embodiment Jurisdiction C broadcasts the message over Network C serving the southwest area of the target area 1502 defined by the jurisdictional border A/C, the river border B/C and the perimeter of the polygon within jurisdiction C. Similarly, jurisdiction A processes the broadcast request message from the international bureau and upon successful admission control validation, transmits the broadcast message to network A. Network A broadcasts the message from cells 118A that provide broadcast message coverage for the northwest area of polygon 1502 defined by the border A/B, border A/C and the portion of polygon 1502 within jurisdiction A.

While for reasons of clarity, the networks are shown as having non-overlapping service areas, a given transmission network may serve segments of multiple jurisdictions, in which case, it would broadcast the authenticated message to those portions of its network in each jurisdiction.

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

APPENDIX 1

Code Channel Assignments

Other channels at the discretion of the networks, and in conjunction with the governmental authorities and other interested parties.

| | |
|---|---|
| 500 | common training, exercise and test channel. |
| 501-650 | Languages listed in order according to ISO 639. |
| 501 | aa Afar |
| 502 | ab Abkhazian |
| 503 | af Afrikaans |
| 504 | am Amharic |
| 505 | ar Arabic |
| 506 | as Assamese |
| 507 | ay Aymara |
| 508 | az Azerbaijani |
| 509 | ba Bashkir |
| 510 | be Byelorussian |
| 511 | bg Bulgarian |
| 512 | bh Bihari |
| 513 | bi Bislama |
| 514 | bn Bengali, Bangla |
| 515 | bo Tibetan |
| 516 | br Breton |
| 517 | ca Catalan |
| 518 | co Corsican |
| 519 | cs Czech |
| 520 | cy Welsh |
| 521 | da Danish |
| 522 | de German |
| 523 | dz Bhutani |
| 524 | el Greek |
| 525 | en English |
| 526 | eo Esperanto |
| 527 | es Spanish |
| 528 | et Estonian |
| 529 | eu Basque |
| 530 | fa Persian |
| 531 | fi Finnish |
| 532 | fj Fiji |
| 533 | fo Faeroese |
| 534 | fr French |
| 535 | fy Frisian |
| 536 | ga Irish |
| 537 | gd Scots Gaelic |
| 538 | gl Galician |
| 539 | gn Guarani |
| 540 | gu Gujarati |
| 541 | ha Hausa |
| 542 | hi Hindi |
| 543 | hr Croatian |
| 544 | hu Hungarian |
| 555 | hy Armenian |
| 556 | ia Interlingua |
| 557 | ie Interlingue |
| 558 | ik Inupiak |
| 559 | in Indonesian |
| 560 | is Icelandic |
| 561 | it Italian |
| 562 | iw Hebrew |

-continued

| | |
|---|---|
| 563 | ja Japanese |
| 564 | ji Yiddish |
| 565 | jw Javanese |
| 566 | ka Georgian |
| 567 | kk Kazakh |
| 568 | kl Greenlandic |
| 569 | km Cambodian |
| 570 | kn Kannada |
| 571 | ko Korean |
| 572 | ks Kashmiri |
| 573 | ku Kurdish |
| 574 | ky Kirghiz |
| 575 | la Latin |
| 576 | ln Lingala |
| 577 | lo Laothian |
| 578 | lt Lithuanian |
| 579 | lv Latvian, Lettish |
| 580 | mg Malagasy |
| 581 | mi Maori |
| 582 | mk Macedonian |
| 583 | ml Malayalam |
| 584 | mn Mongolian |
| 585 | mo Moldavian |
| 586 | mr Marathi |
| 587 | ms Malay |
| 588 | mt Maltese |
| 589 | my Burmese |
| 590 | na Nauru |
| 591 | ne Nepali |
| 592 | nl Dutch |
| 593 | no Norwegian |
| 594 | oc Occitan |
| 595 | om (Afan) Oromo |
| 596 | or Oriya |
| 597 | pa Punjabi |
| 598 | pl Polish |
| 599 | ps Pashto, Pushto |
| 600 | pt Portuguese |
| 601 | qu Quechua |
| 602 | rm Rhaeto-Romance |
| 603 | rn Kirundi |
| 604 | ro Romanian |
| 605 | ru Russian |
| 606 | rw Kinyarwanda |
| 607 | sa Sanskrit |
| 608 | sd Sindhi |
| 609 | sg Sangro |
| 610 | sh Serbo-Croatian |
| 611 | si Singhalese |
| 612 | sk Slovak |
| 613 | sl Slovenian |
| 614 | sm Samoan |
| 615 | sn Shona |
| 616 | so Somali |
| 617 | sq Albanian |
| 618 | sr Serbian |
| 619 | ss Siswati |
| 620 | st Sesotho |
| 621 | su Sundanese |
| 622 | sv Swedish |
| 623 | sw Swahili |
| 624 | ta Tamil |
| 625 | te Tegulu |
| 626 | tg Tajik |
| 627 | th Thai |
| 628 | ti Tigrinya |
| 629 | tk Turkmen |
| 630 | tl Tagalog |
| 631 | tn Setswana |
| 632 | to Tonga |
| 633 | tr Turkish |
| 634 | ts Tsonga |
| 635 | tt Tatar |
| 636 | tw Twi |
| 637 | uk Ukrainian |
| 638 | ur Urdu |
| 639 | uz Uzbek |
| 640 | vi Vietnamese |
| 641 | vo Volapuk |
| 642 | wo Wolof |

-continued

| | | |
|---|---|---|
| 643 | xh | Xhosa |
| 644 | yo | Yoruba |
| 645 | zh | Chinese |
| 646 | zu | Zulu |
| 646-669 | | locally specified purpose or language. |
| 670-699 | | International alert channels. |
| 671 | | Maritime service channel. |
| 672 | | Aeronautical service channels. |
| 673 | | Amateur service channels. |
| 674 | | Scientific services. |
| 690-699 | | UN and International Organisations. E.G. |
| 690 | | UNSECORD (UN Security Co-Ordinator.) |
| 691 | | UNICEF (Child security) |
| 692 | | WFP |
| 693 | | WHO |
| 694 | | UNHCR |
| 695 | | OCHA |
| 696 | | Red Cross/Crescent Movement. |

What is claimed is:

1. A message broadcasting control system providing a broadcast message to a broadcast target area, the system comprising:
   a broadcast admission control module receiving the broadcast message record having a broadcast message, a defined broadcast target area, and a broadcast message originator identifier, validating the broadcast message record as a function one or more of the broadcast message originator identifier, the broadcast target area, and a broadcast message transmission network parameter associated with a broadcast transmission network adapted for broadcasting the message to at least a portion of the broadcast target area, said broadcast admission control module generating a validated broadcast message record as a function of the validating; and
   a broadcast message distributor module receiving the validated broadcast message record and transmitting the broadcast message and the broadcast target area, or a part thereof, to an output interface distributing the broadcast message to at least a portion of the broadcast target area.

2. The system of claim 1, further comprising a broadcast network interface module coupled to the broadcast message distributor module for receiving the broadcast message record and forwarding the broadcast message record to a broadcast network transmission module associated with at least one of the broadcast message transmission networks.

3. The system of claim 2, further comprising the broadcast network transmission module associated with at least one of the broadcast message transmission networks and coupled to one of more network transmission components within the at least one broadcast message transmission network transmitting the broadcast message to broadcast message receiving devices within the broadcast target area.

4. The system of claim 3 wherein the broadcast network transmission module receives the validated broadcast message record and determines at least one network transmission component address as a function of the broadcast target area within the validated broadcast message record and transmits the broadcast message to the network transmission component having the component address for transmission to the broadcast message receiving devices.

5. The system of claim 3 wherein the broadcast network transmission module is dedicated to one particular broadcast message transmission network.

6. The system of claim 3 wherein the broadcast network transmission module is a service bureau coupled to a plurality of broadcast message transmission networks.

7. The system of claim 1 wherein the broadcast admission control module verifies an authority of the broadcast message originator as a function of a broadcast message originator authorization parameter, said transmitting the broadcast message being responsive to the authority verification.

8. The system of claim 1 wherein the broadcast admission control module validates including validating the authority of a broadcast message originator as a function of a broadcast message originator parameter.

9. The system of claim 8 wherein the broadcast message originator parameter includes one or more of an authorized broadcast message originator identification code, a message priority, an authorized message target broadcast geographic area, a geographic broadcast area authorization flag or parameter, a reusable geographic broadcast target area template definition authorization parameter, an authorized broadcast network distribution parameter, a broadcast message profile parameter, a message language text parameter, and a geographic broadcast target area message language priority parameter.

10. The system of claim 1 wherein the broadcast admission control module validating includes identifying a broadcast transmission network providing broadcast message communications to broadcast message receiving devices within the broadcast target area and validating the broadcast transmission network against a broadcast network parameter.

11. The system of claim 10 wherein the broadcast network parameter includes one or more of a reusable geographic broadcast target area template definition parameter, a broadcast message target area parameter, a message priority, a message language text format parameter, a network authorization parameter, and a message language priority indicator.

12. The system of claim 1 wherein the broadcast admission control module identifying one or more broadcast transmission networks providing broadcast message communications to broadcast message receiving devices located within the broadcast target area and validating at least one of the identified broadcast transmission networks against a broadcast transmission network authority parameter.

13. The system of claim 1 wherein the broadcast admission control module validating the broadcast message record against a plurality of broadcast transmission network parameters, wherein the broadcast transmission network parameters are associated with a particular broadcast transmission network.

14. A method of broadcast messaging to a broadcast target area, the method comprising:
   receiving a broadcast message record having a broadcast message, a defined broadcast target area, and a broadcast message originator identifier;
   validating the broadcast message record as a function one or more of the broadcast message originator identifier, the broadcast target area, and a broadcast message transmission network parameter associated with a broadcast transmission network broadcasting the message to at least a portion of the broadcast target area;
   generating a validated broadcast message record as a function of the validating; and
   transmitting the generated validated broadcast message record to an output interface.

15. The method of claim 14 wherein validating includes verifying an authority of a broadcast message originator as a function of a broadcast message originator authorization parameter and the broadcast target area.

16. The method of claim 14 wherein the broadcast message originator authorization parameter includes a geographic parameter defining an area in which the broadcast message originator is authorized to originate a broadcast message contained within the broadcast message record.

17. The method of claim 14 wherein transmitting includes transmitting the broadcast message and broadcast target area to one of a plurality of broadcast transmission networks serving, at least in part, the broadcast target area as a function of a message admission control parameter associated with the one broadcast transmission network.

18. The method of claim 14, further comprising transmitting at least one area identification parameter within the message target broadcast area to at least one network broadcast center.

19. The method of claim 14, further comprising identifying one or more broadcast transmission networks providing broadcast message communications to broadcast message receiving devices located within the broadcast target area, wherein validating includes validating one of the identified broadcast transmission networks against a broadcast transmission network authority parameter.

20. The method of claim 14 wherein validating includes comparing the broadcast message record against a plurality of broadcast transmission network parameters, wherein each of the broadcast transmission network parameters are associated with a particular broadcast transmission network.

21. The method of claim 14 wherein validating includes identifying a broadcast transmission network providing broadcast message communications to broadcast message receiving devices within the broadcast target area and validating the broadcast transmission network against a broadcast network parameter.

22. The method of claim 21 wherein the broadcast network parameter includes one or more of a reusable geographic broadcast target area template definition parameter, a broadcast message target area parameter, a message language text format parameter, a network authorization parameter, and a message language priority indicator.

23. A method of broadcast message control including authorizing a submission of a broadcast message to a broadcast target area, comprising:
 validating an authority of a broadcast message originator that originated a broadcast message record including the broadcast message and the broadcast target area as a function of a broadcast message originator parameter;
 identifying a broadcast transmission network providing broadcast message transmission to broadcast message receiving devices located within the broadcast target area;
 validating the broadcast transmission network against a broadcast transmission network parameter; and
 forwarding the broadcast message record to an output interface associated with the broadcast transmission network for transmission to the broadcast message receiving devices within the broadcast target area.

24. The method of claim 23, further comprising identifying one or more broadcast transmission networks providing broadcast message transmissions to broadcast message receiving devices located within the broadcast target area and validating at least one of the identified broadcast transmission networks against a broadcast transmission network authority parameter.

25. The method of claim 23 wherein validating the broadcast transmission network includes validating the broadcast message record and broadcast transmission network against a plurality of broadcast transmission network parameters.

26. The method of claim 25, further comprising comparing the broadcast message record to a broadcast transmission network decline parameter in response to a failure of validating against one of the plurality of broadcast transmission network parameters.

27. The method of claim 23 wherein validating includes comparing against a broadcast message originator parameter including one or more of an authorized broadcast message originator identification code, an authorized message target broadcast geographic area, a message priority, a geographic broadcast area authorization flag or parameter, a reusable geographic broadcast target area template definition authorization parameter, an authorized broadcast network distribution network parameter, a broadcast message profile parameter, a message language text parameter, and a geographic broadcast target area message language priority parameter.

28. The method of claim 23 wherein the broadcast network parameter includes one or more of a reusable geographic broadcast target area template definition parameter, a broadcast message target area parameter, a message priority, a message language text format parameter, and a message language priority indicator.

29. The method of claim 23, further comprising validating the broadcast message record against an authorized message parameter associated with the broadcast network, wherein forwarding the broadcast message record is in response to successfully validating the broadcast message for the broadcast network.

30. The method of claim 23 wherein validating includes comparing a parameter associated with the broadcast message record to a stored authorization parameter.

\* \* \* \* \*

UNITED STATES PATENT AND TRADEMARK OFFICE
CERTIFICATE OF CORRECTION

PATENT NO. : 8,103,719 B2  
APPLICATION NO. : 12/726098  
DATED : January 24, 2012  
INVENTOR(S) : Douglas Weiser, Mark Andrew Wood and Kevin Russell Preston It is certified that error appears in the above-identified patent and that said Letters Patent is hereby corrected as shown below:

Please correct the Title page of the issued patent entitled: "Related U.S. Application Data" identified as (63) & (60) to the priority as claimed in the Cross Reference to Related Applications section as follows:

Item --(63) This application is a continuation of U.S. Nonprovisional Application No. 11/602,461 filed on November 20, 2006 and claims the benefit of U.S. Provisional Application No. 60/739,819, filed on November 23, 2005, and of U.S. Patent Application 11/057,704, filed on February 14, 2005, that claimed priority to U.S. Provisional Application No. 60/544,739, filed on February 13, 2004.--

Signed and Sealed this
Eighth Day of October, 2013

Teresa Stanek Rea
*Deputy Director of the United States Patent and Trademark Office*